United States Patent [19]
Esaki

[11] Patent Number: 5,078,661
[45] Date of Patent: Jan. 7, 1992

[54] DIFFERENTIAL

[75] Inventor: Seiji Esaki, Hiroshima, Japan

[73] Assignee: Mazda Motor Corporation, Hiroshima, Japan

[21] Appl. No.: 573,890

[22] Filed: Aug. 28, 1990

[30] Foreign Application Priority Data

Aug. 30, 1989 [JP] Japan .................. 1-223881
Aug. 30, 1989 [JP] Japan .................. 1-223882
Aug. 30, 1989 [JP] Japan .................. 1-223883
Aug. 30, 1989 [JP] Japan .................. 1-223884
Aug. 31, 1989 [JP] Japan .................. 1-101989[U]
Sep. 20, 1989 [JP] Japan .................. 1-110083[U]
Sep. 20, 1989 [JP] Japan .................. 1-110084[U]

[51] Int. Cl.$^5$ .............................. F16H 1/44
[52] U.S. Cl. ........................ 475/90; 475/89; 475/249
[58] Field of Search ............. 475/248, 249, 90, 91, 475/92, 93, 94, 107, 108, 89; 192/61, 82 T; 74/468

[56] References Cited

U.S. PATENT DOCUMENTS

| 1,756,939 | 5/1930 | Crawford | 475/249 X |
| 1,918,864 | 7/1933 | Priest | 475/249 |
| 2,550,750 | 5/1951 | Abelt | 475/249 |
| 2,931,472 | 4/1960 | Ahlen | 192/61 |
| 3,251,244 | 5/1966 | Nickell | 475/90 |
| 3,424,022 | 1/1969 | Greenberg et al. | 74/468 |
| 3,822,607 | 7/1974 | Tharaldsen | 74/468 |
| 3,923,113 | 12/1975 | Pagdin | 192/82 T X |
| 4,078,453 | 3/1978 | Brace | 192/61 X |
| 4,272,993 | 6/1981 | Kopich | 475/90 |
| 4,310,084 | 1/1982 | Nonnenmann | 192/82 T X |
| 4,630,505 | 12/1986 | Williamson | 475/90 |
| 4,762,023 | 8/1988 | Ivy | 475/249 |
| 4,779,699 | 10/1988 | Hatano | 475/249 X |

FOREIGN PATENT DOCUMENTS 49-7657 2/1974 Japan .

Primary Examiner—Leslie A. Braun
Assistant Examiner—Matthew Stavish
Attorney, Agent, or Firm—Fleit, Jacobson, Cohn, Price, Holman & Stern

[57] ABSTRACT

A differential for use in a car includes a case rotatable around an axis, an input gear fixed to the case, coaxial with the axis of the case, a pair of output shafts which are rotatably supported by the case coaxially with the axis of the case and protrude from opposite ends of the case, a pair of intermeshing first gears disposed in the case at opposite sides of the axis of the case and rotatably supported by the case, a pair of second gears disposed in the case, a pair of third gears disposed in the case coaxially with the axis of the case, and at least one gear pump defined by at least one of the pairs of intermeshing gears. The differential restricts a flow of an operation oil of the gear pump so as to generate a load on the gear pump. One of the second gears is located at one side of and coaxial with one of the first gears and rotates integrally with this first gear. The other of the second gears is located at the other side of and coaxial with the other one of the first gears and rotates integrally with this first gear. One of the third gears rotates integrally with one of the output shafts and meshes with one of the second gears. The other of the third gears rotates integrally with the other of the output shafts and intermeshes with the other of the second gears. The gear pump has two chambers one of which operates as an inlet chamber. The other chamber operates as an outlet chamber in response to the direction of the rotation of the gears. The gear pump and the restricted flow of the operation oil of the gear pump combine a restrict a differential motion of the differential.

11 Claims, 19 Drawing Sheets

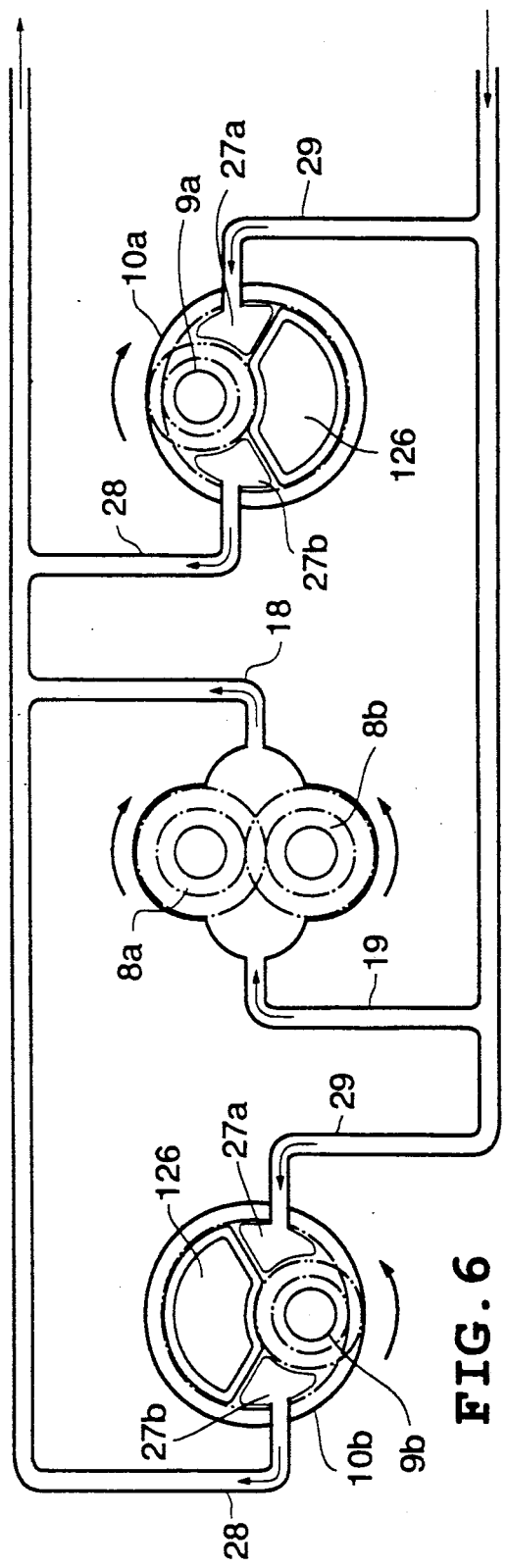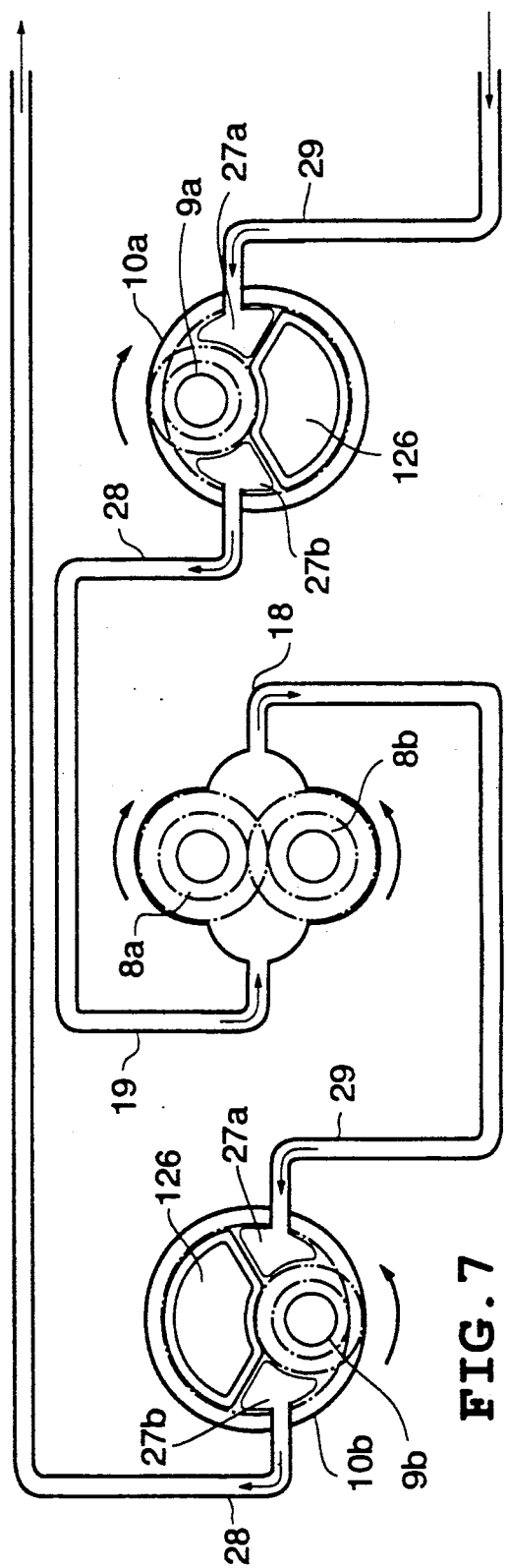

DIFFERENTIAL

BACKGROUND OF THE INVENTION

1. Field of the Invention

The present invention relates to a differential, and more specifically to a differential having means for restricting a differential motion.

2. Description of the Prior Art

It is preferable for a four wheel drive car to be provided with a differential between the front axle and the rear axle so as to prevent a braking phenomenon in rounding a turn. When a differential is provided between the front axle and the rear axle, the provision of means for restricting a differential motion is necessary in order to prevent the loss of driving force due to the wheels slipping. Combinations of viscous-couplings have been used as the means for restricting a differential motion. But the viscous-couplings generate fairly large restrictive torque on the differential motion when a differential rotation is fairly small so that it causes the braking phenomenon in rounding a turn with a small radius. As shown in Japanese Patent Laid-Open Publication No. 61-155028, locking mechanisms for the differential such as hydraulic clutches, etc., also have been proposed. But the locking mechanisms for the differentials such as hydraulic clutches, etc., have complicated constructions and need spaces wherein they can be placed. As a result the size of the differential becomes large. Moreover, the provision of mechanisms for controlling the hydraulic clutches, etc., is necessary.

SUMMARY OF THE INVENTION

It is therefore the object of the present invention to provide a differential having means for restricting a differential motion which can effectively restrict a fairly large differential rotation, while it generates a fairly small restrictive torque on the differential rotation when the differential rotation is small.

In accordance with the present invention, there is provided a differential for use in a car which comprises a case rotatable around an axis, an input gear fixed to the case coaxially with the axis of the case, a pair of output shafts which are rotatably supported by the case coaxially with the axis of the case and protrude from opposite ends of the case, a pair of intermeshing first gears disposed in the case at opposite sides of the axis of the case and rotatably supported by the case, a pair of second gears disposed in the case, one of said second gears being located at one side of and coaxial with one of the first gears and rotatable integrally with this first gear, the other of said second gears being located at the other side of and coaxial with the other one of the first gears and rotatable integrally with this first gear, a pair of third gears disposed in the case coaxially with the axis of the case, one of said third gears rotatable integrally with one of the output shafts and meshing with one of the second gears, the other of said third gears rotatable integrally with the other of the output shafts and intermeshing with the other of the second gears, at least one gear pump being defined by at least one of the pairs of intermeshing gears, said gear pump having two chambers, one of which operates as an inlet chamber and the other operates as an outlet chamber in response to the direction of the rotation of the gears, and means for restricting a flow of an operation oil of the gear pump so as to generate a load on the gear pump. The gear pump and the means for restricting a flow of an operation oil of the gear pump define means for restricting a differential motion of said differential.

According to the features of the present invention, the means for restricting a flow of an operation oil of the gear pump generates a load on the gear pump. The load on the gear pump becomes larger as the differential rotation between the output shafts becomes larger so that the load on the gear pump restricts the differential motion of the differential. The load on the gear pump is very small when the differential rotation between the output shafts is rather small so that the diferential fulfills its normal function without causing the braking phenomenon. The gear pump is defined by using the gears defining the differential so that the differential needs no additional part which would be necessary in the hydraulic clutch. Thus no special space is necessary for the differential.

In a preferable embodiment of the present invention, the differential may further comprise a pair of idling gears in the case, one of said idling gears being located coaxially with one of the second gears at the opposite side of the first gear with which said second gear being rotatable integrally, the other of said idling gears being located coaxially with the other of the second gears at the opposite side of the first gear with which said second gear being rotatable integrally, each of said idling gears intermeshing respectively with a corresponding one of the third gears, one gear pump being defined by each pair of intermeshing gears.

According to the features of the above embodiment, a balanced arrangement of the rotation members around the rotation axis of the case of the differential can be obtained.

When the means for restricting the flow of the operation oil of the gear pump is defined by through holes formed in the teeth of the gears which define the gear pump or channels formed on the teeth of the gears which define the gear pump, passages for the operation oil are unnecessary so that the construction of the differential becomes simple.

The second gears are preferably external gears, while the third gears may be external gears or internal gears.

One gear pump may be defined by each pair of intermeshing gears and these gear pumps may be communicated in series with each other or in parallel with each other.

One gear train from the input gear to one of the output shafts may have a different gear ratio from that of the other gear train from the input gear to the other of the output shafts so that a driving torque input on the input gear is transmitted to the output shafts with a predetermined distribution ratio.

The differential in accordance with the present invention may further comprise a reservoir of the operation oil of the gear pump and passage means for connecting said two chambers to the reservoir, said passage means comprising a switching valve which takes a first position and a second position in response to a differential pressure between the two chambers, an inlet passage extending from the reservoir to the switching valve and an outlet passage extending from the switching valve to the reservoir, said switching valve connecting the inlet passage to one of the two chambers and the outlet passage to the other of the two chambers at the first position, while connecting the outlet passage to said one of the two chambers and the inlet passage to said other of the two chambers at the second position. In accordance with the above construction, when the gear pump rotates in one direction in response to a differential motion of the differential, the switching valve moves to the first position, for example, in response to a differential pressure between the two chambers of the gear pump. In this condition, the inlet passage is connected to one of the two chambers and the outlet passage is connected to the other of the two chambers. When the direction of the differential motion is reversed, that is, the direction of the rotation of the gear pump is reversed, the switching valve moves to the second position, the outlet passage is connected to said one of the two chambers, and the inlet passage is connected to the other of the two chambers. In either condition, the liquid in the inlet passage and the outlet passage respectively flows in one direction. Thus, regardless of the direction of the differential movement of the differential, only one inlet passage and one outlet passage are necessary for the gear pump. There is no need to provide each chamber with the inlet passage and the outlet passage.

The differential in accordance with the present invention may further comprise means for prohibiting the flow of the operation oil of the gear pump when the temperature of the operation oil rises up to a predetermined point. In accordance with the above construction, when the differential rotation between the output shafts becomes large and the temperature of the operation oil rises up to a predetermined point in spite of the operation of the means for restricting a flow of the operation oil of the gear pump, the flow of the operation oil of the gear pump is prohibited and the differential is locked. Thus, when the differential is used between a front axle and a rear axle of a four wheel drive car and the differential rotation between the fore axle and the rear axle becomes extremely large because the front wheels or the rear wheels become stuck for example, it is easy to get rid of such an above situation.

The differential in accordance with the present invention may further comprise means for changing the discharge pressure of the gear pump into a lower pressure in response to an increase in the travelling speed of the car. In accordance with the above construction, when the travelling speed of the car is high, wherein the differential rotation between the output shafts is large but the ratios of the differential rotation to the rotation speeds of the output shafts are small so that the need to restrict the differential motion is small, the discharge pressure of the gear pump is kept from increasing by the means for changing the discharge pressure of the gear pump into a lower pressure, and the degree of the restriction of the differential motion is kept from increasing. As a result, fuel consumption is improved when the travelling speed of the car is high.

In a preferable aspect of the present invention, there is provided a differential for use in a car which comprises a first rotation member, a second rotation member, a third rotation member, said first rotation member being an input member and said second and third rotation members being output members, a gear train for connecting these rotation members so that a differential motion is allowed between the second rotation member and the third rotation member in response to an input on the first rotation member, at least one gear pump defined by at least one of the pairs of intermeshing gears which define the gear train, means for restricting a flow of an operation oil of the gear pump so as to generate a load on the gear pump, said gear pump and said means for restricting the flow of the operation oil of the gear pump defining means for restricting a differential motion of said differential, and change-gear means defined between the gear pump and the second rotation member, and between the gear pump and the third rotation member.

According to the above features, the degree of the restriction of the differential motion by the gear pump can be controlled by controlling the gear ratio of the change-gear means. Thus, it is unnecessary to change the capacity of the gear pump so as to change the degree of the restriction of the differential motion.

The change gear means may be a reduction gear which transmits a torque from the gear pump to the second and the third rotation members with a reduction of the rotation speed.

In this case, the rotation speed of the gear pump is higher than that of the output members. Thus, restrictive effect of the differential motion can be sufficiently achieved even by a small gear pump.

In another preferable aspect of the present invention, there is provided a four wheel drive car comprising a front axle having a pair of front wheels at both ends thereof, a rear axle having a pair of rear wheels at both ends thereof, an engine having a driving shaft, said driving shaft of said engine being connected to said front axle and said rear axle through a differential disposed between said front axle and said rear axle, said differential comprising a first rotation member, a second rotation member, a third rotation member, said first rotation member being an input member and said second and third rotation members being output members, a gear train for connecting these rotation members so that a differential motion is allowed between the second rotation member and the third rotation member in response to an input on the first rotation member, at least one gear pump defined by at least one of the pairs of intermeshing gears which define the gear train, and means for restricting a flow of an operation oil of the gear pump so as to generate a load on the gear pump, said gear pump and said means for restricting the flow of the operation oil of the gear pump defining means for restricting a differential motion of said differential, a portion of said gear train connecting the first rotation member to the second rotation member having a different gear ratio from that of a portion of said gear train connecting the first rotation member to the third rotation member, one of said output members of the differential connected to the gear train having a higher gear ratio being connected to the front axle and the other of said output members of the differential connected to the gear train having a lower gear ratio being connected to the rear axle.

The above and other objects and features of the present invention will be apparent from the following description of the preferred embodiments when taken in conjunction with reference to the accompanying drawings.

BRIEF DESCRIPTION OF THE DRAWINGS

FIG. 6 is a development view showing a variation of the first embodiment.

FIG. 7 is a development view showing another variation of the first embodiment.

DESCRIPTION OF THE PREFERRED EMBODIMENTS

Figure 1:
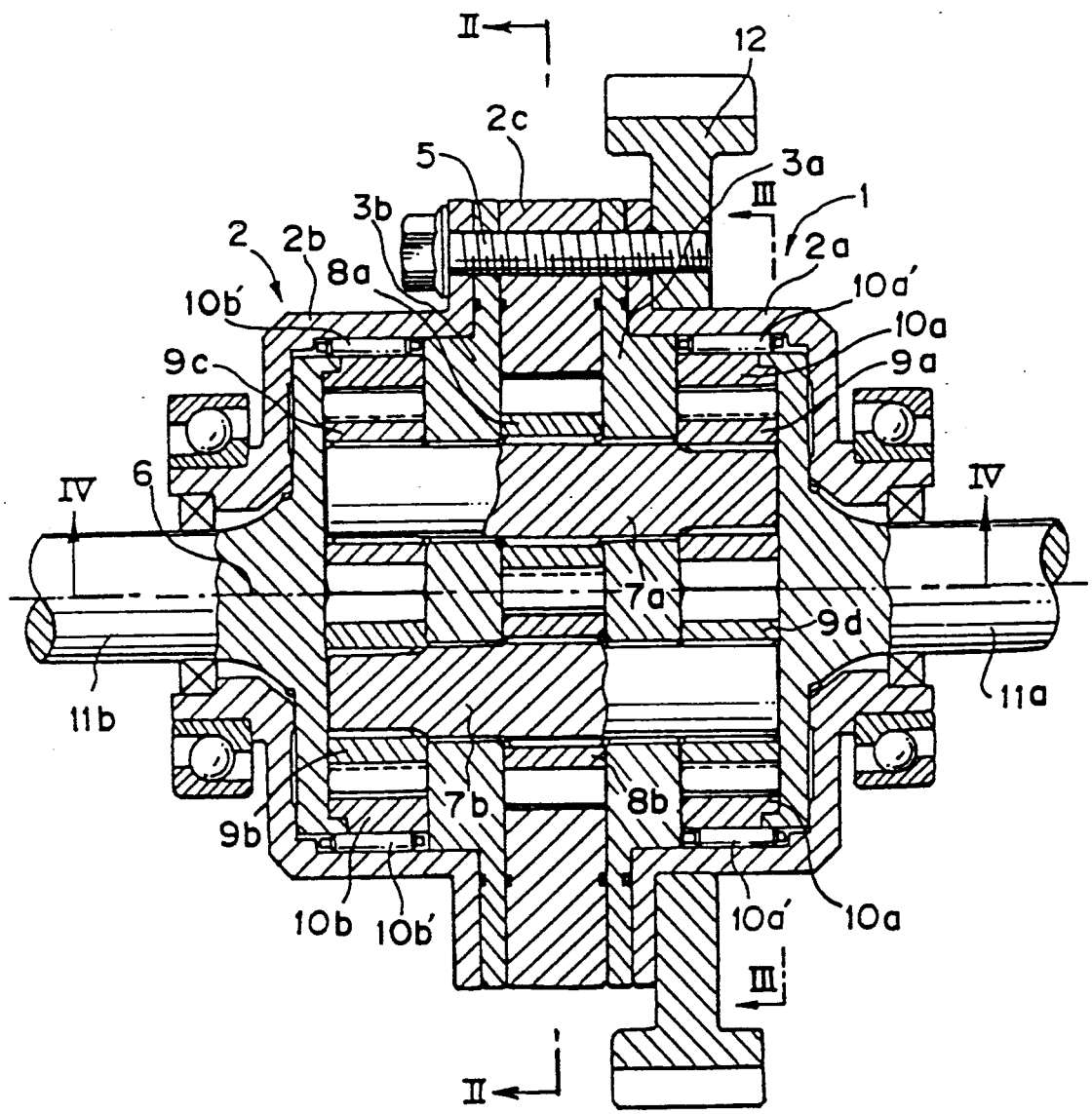
FIG. 1 is a cross sectional view showing a first embodiment of the present invention.

Referring to FIGS. 1 through 4, a differential 1 according to a first embodiment of the present invention has a rotatable case 2. The case 2 is constructed with a pair of cup shaped case half portions 2a2b and mid plate 2c. The case half portions 2a, 2b and mid plate 2c are fixedly interconnected by bolts 5 with side plate 3a between the case half portion 2a and the mid plate 2c at its periphery, and with side plate 3b between the case half portion 2b and the mid plate 2c at its periphery. The case 2 is rotatable around a center axis 6 of the cup shaped case half portions 2a and 2b. A pair of supporting shafts 7a and 7b are provided symmetrically about the center axis 6 through the side plates 3a and 3b, and are rotatably supported by the side plates 3a and 3b. A pair of intermeshing gears 8a, 8b are fixed to the supporting shafts 7a, 7b, respectively.

The supporting shaft 7a extends through the side plates 3a and 3b, and each end of the shaft 7a protrudes into the case half portions 2a, 2b, respectively. An external gear or a second gear 9a is fixed to the end of the shaft 7a protruding into the case half portion 2a. The supporting shaft 7b extends through the side plates 3a and 3b, and each end of the shaft 7b protrudes into the case half portions 2a, 2b respectively. An external gear or a third gear 9b is fixed to the end of the shaft 7b protruding into the case half portion 2b. Internal gears 10a, 10b are respectively disposed in and coaxial with the case half portions 2a, 2b. The internal gears 10a, 10b are rotatably supported at their peripheries respectively by the case half portions 2a, 2b through bearings 10a', 10b'. The second and the third gears 9a, 9b intermesh respectively with the internal gears 10a, 10b. Rotation members, or output shafts 11a, 11b are respectively supported by and coaxial with the case half portions 2a, 2b. The internal gears 10a, 10b are fixed respectively to the output shafts 11a, 11b. The end of the shaft 7a protruding into the case half portion 2b is provided with an idling gear 9c, and the end of the shaft 7b protruding into the case half portion 2a is provided with an idling gear 9d. The idling gears 9c, 9d are rotatably supported respectively by the shafts 7a, 7b, and intermesh respectively with the internal gears 10a, 10b.

In the differential 1, an input gear 12 is fixed to the case 2 so as to rotate the case 2 by a driving force acting on the gear 12. The gears 8a, 8b fixed respectively to the supporting shafts 7a, 7b revolve around the axis 6 in response to the rotation of the case 2, with their intermeshing being maintained. When there is no differential motion between the output shafts or output shafts 11a, 11b, the gears 8a, 8b do not rotate on their own axes, and the gears 8a, 8b and the case 2 revolute integrally around the axis 6. The gears 9a and 9b also do not rotate on their own axes. Thus the rotation of the case 2 is transmitted through the gears 9a, 9b to the internal gears 10a, 10b, and the internal gears 10a, 10b rotate together with the output shafts 11a, 11b.

When there is a differntial motion between the output shafts 11a, 11b because of a difference between the loads on the output shafts 11a, 11b, the gears 8a, 8b rotate relatively to each other, that is they rotate on their own axes. The gears 9a, 9b also rotate relatively to the internal gears 10a, 10b respectively. These relative rotations become larger as the difference between the rotation speeds of the shafts 11a and 11b become larger.

Figure 2:
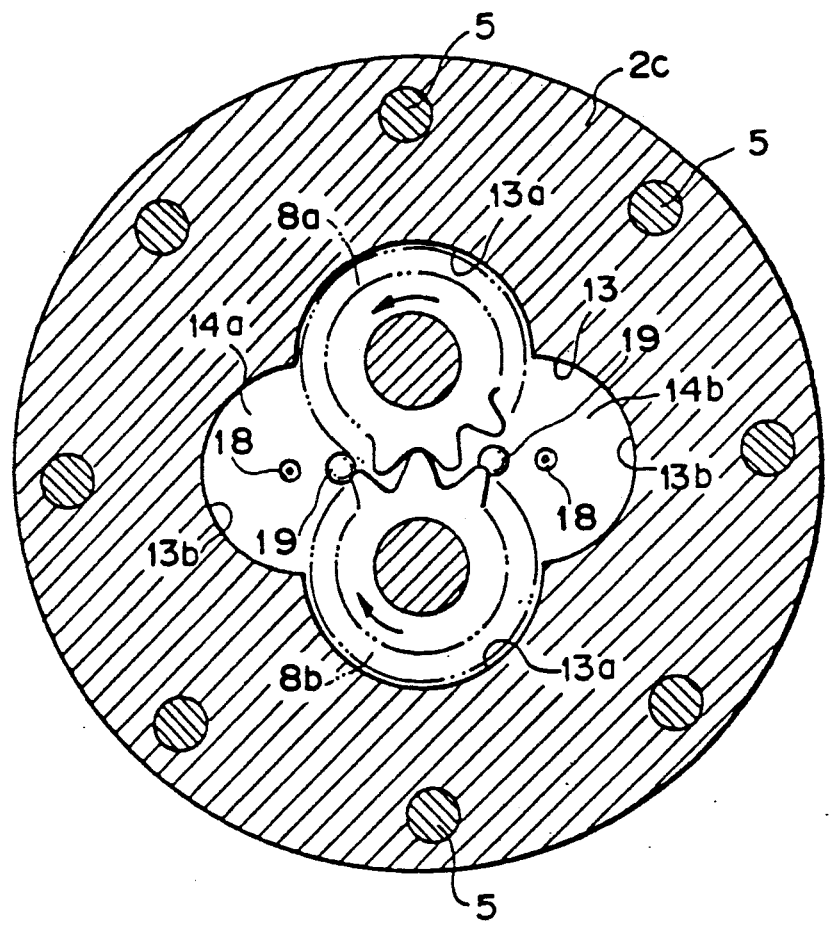
FIG. 2 is a cross sectional view taken along the line II—II in FIG. 1.
Figure 4:
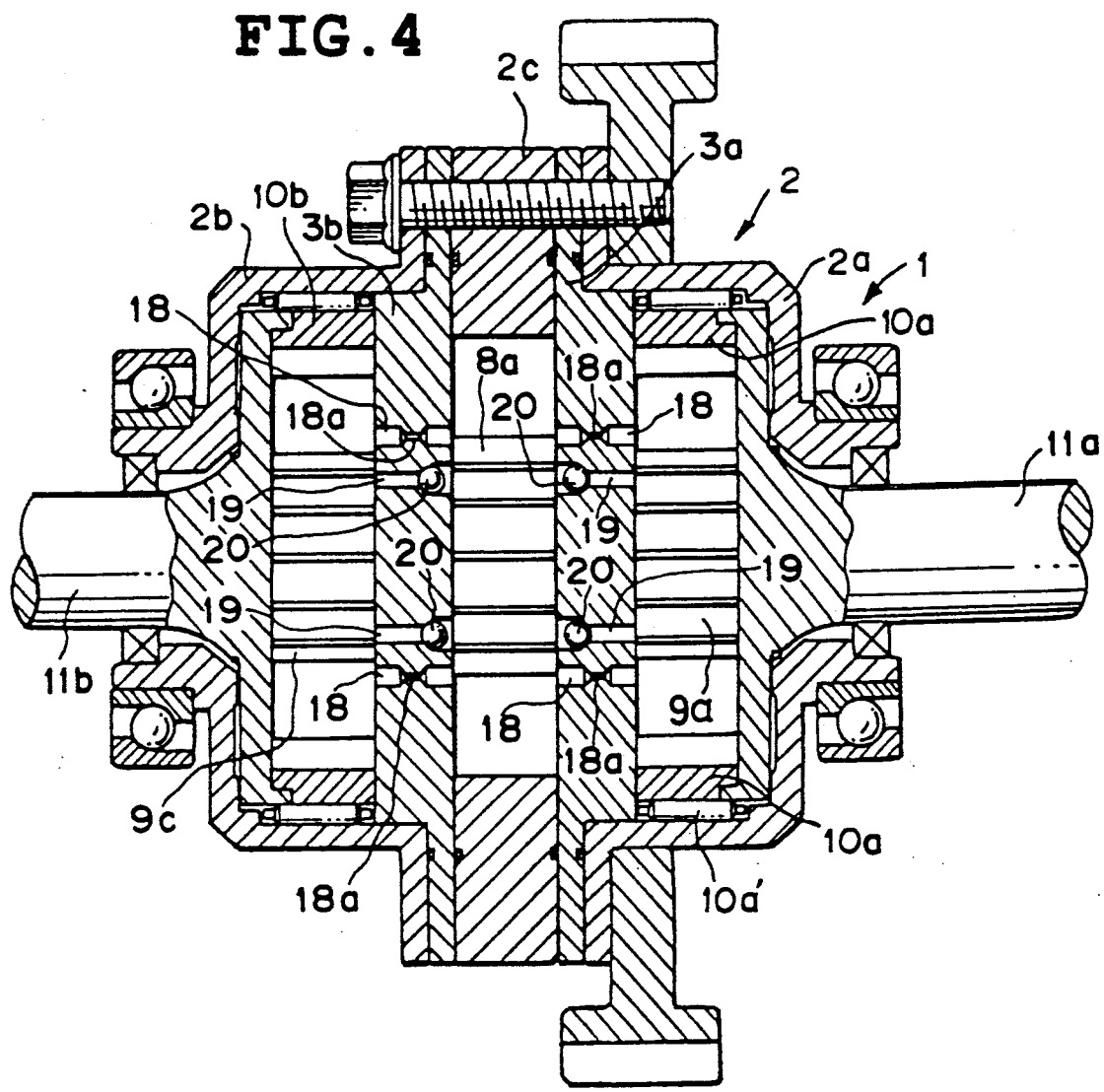
FIG. 4 is a cross sectional view taken along the line IV—IV in FIG. 1.

In this embodiment of the present invention, gear pumps are defined by all of these above gears so as to define means for restricting the differential motion between the shafts 11a and 11b by using the relative rotations between the gears 8a and 8b, gears 9a and 10a, and gears 9b and 10b. As shown in FIG. 2, a cross shaped hole 13 is formed in the mild plate 2c to define a gear pump by gears 8a and 8b. The hole 13 comprises a pair of semicircular portions 13a, 13a diametrically opposed to each other and a pair of semicircular portions 13b, 13b diametrically opposed to each other in the direction normal to the direction from one of the semicircular portions 13a to the other. The pair of gears 8a, 8b are disposed respectively in the pair of semicircular portions 13a, 13a and the pair of semicircular portions 13b, 13b form chambers 14a and 14b, respectively. As shown in FIGS. 1 and 4, the gears 8a, 8b are so disposed as to tightly abut against the side plates 3 at both sides thereof.

Figure 3:
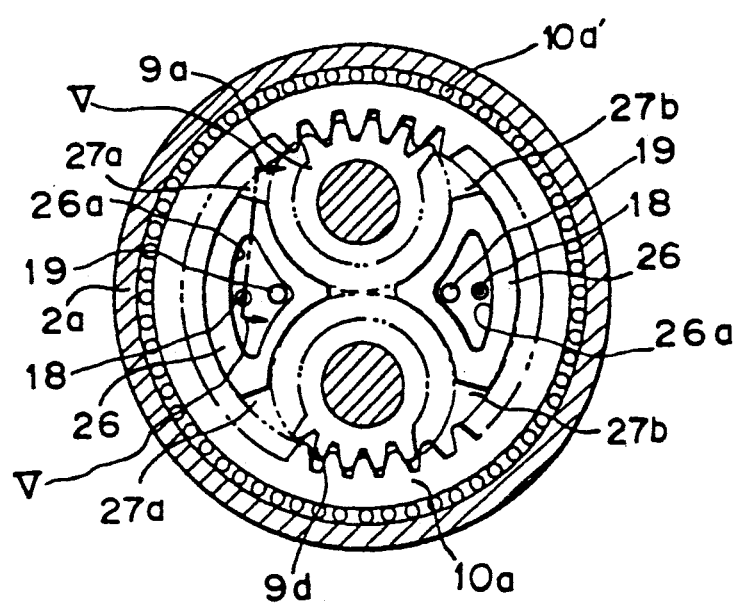
FIG. 3 is a cross sectional view taken along the line III—III in FIG. 1.

An arrangement for defining a gear pump by the gear 9a, the idling gear 9d and the internal gear 10a is shown in FIG. 3. As shown in FIG. 3, filling plates 26 are provided so as to fill the spaces between the gear 9a, the internal gear 10a and the idling gear 9d. The filling plates 26 are cut out at both ends so that the gear 9a and the idling gear 9d are each provided with chambers 27a and 27b at both sides thereof. Thus gear pumps are formed between the gear 9a and the internal gear 10a, and between the idling gear 9d and the internal gear 10a. The chambers 27a, 27b operate as outlet chambers or inlet chambers in response to the direction of the rotation of the gears 9a and 9d. The filling plates 26 are hollow and fixed to the side plate 3a. The spaces in the filling plates 26 define reservoirs 26a. In the same way, gear pumps are defined by the gear 9b, the idling gear 9c and the internal gear 10b.

Figure 5:
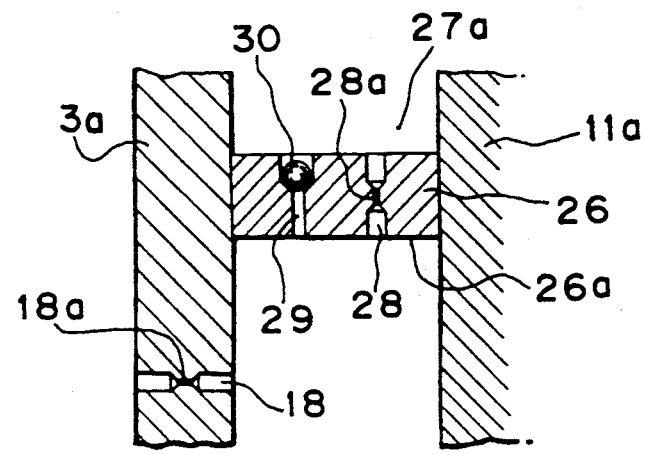
FIG. 5 is a cross sectional view taken along the line V—V in FIG. 3.

As shown in FIG. 4, formed in the side plates 3a, 3b are outlet passages 18 and inlet passages 19 which communicate with either the chambers 14a or 14b and open to the reservoirs 26a. The outlet passages 18 are provided with flow restriction means or orifices 18a. The inlet passages 19 are provided with check valves 20 which open only toward the chambers 14a and 14b. As shown in FIG. 5, formed in the filling plates 26 are outlet passages 28 and inlet passages 29 which communicate with either the chambers 27a or 27b and open to the reservoirs 26a. The outlet passages 28 are provided with orifices 28a. The inlet passages 29 are provided with check valves 30 which open only toward the chambers 27a and 27b.

In this embodiment, an operation oil is reserved in the reservoirs 26a. When the gears 8a, 8b rotate on their own axes, the chambers 14a, 14b operate as outlet chambers or inlet chambers in response to the direction of the rotation of the gears 8a, 8b. For example, when the gears 8a, 8b rotate in the direction shown by arrows in FIG. 2, the chamber 14a operates as an outlet chamber and the chamber 14b operates as an inlet chamber. In the same way, either chambers 27a or 27b operate as outlet chambers and the other chambers operate as inlet chambers in response to the direction of the rotation of the gears 9a, 9b, 9c and 9d. A highly pressurized peration oil in the outlet chamber is discharged through the outlet passage 18 to the reservoirs 26a. Then the highly pressurized operation oil is lead into the inlet chamber from the reservoirs 26a through the inlet passages 19.

The orifices 18a, 28a are formed respectively in the outlet passages 18, 28 so that the highly pressurized operation oil discharged from the outlet chambers meets with resistance when it passes through the orifices 18, 28. This resistance becomes a load on the gear pumps. The larger the differential rotation between the output shafts 11a and 11b is, and the higher the rotation speeds of the gears 8a, 8b, 9a, 9b, 9c and 9d are, the more the resistances of the orifices 18, 28 increase, and as a result the rotations of these gears are more restricted. The differential motion of the differential 1 is restricted by the above restrictive effect on the rotation of the gears. As is obvious from the above description, the restrictive effect on the differential motion is small when the differential rotation between the output shafts 11a and 11b is small. The degree of the restriction of the differential motion can be controlled by changing the sizes of the orifices 18a and 28a.

In the first embodiment, all the gears contribute to defining the gear pumps, but this is not an indispensable feature of the present invention. The gear pump may be defined by the gears 8a, 8b, or by the gear 9a and the internal gear 10a, or by the gear 9b and the internal gear 10b. The idling gears 9c and 9d are not necessarily needed. When the idling gears are not provided, the filling plates should be so designed as to cover the places where the idling gears are provided in the above embodiment. But, the provision of the idling gears 9c, 9d results in advantages, such as an increase in the pump capacity and a balanced arrangement of the rotation members around the rotation axis 6 of the case 2.

In the first embodiment, the gear pumps are defined by the gears 8a, 8b disposed in the center of the differential 1, by the gear 9a, idling gear 9d and the internal gear 10a, and by the gear 9b, idling gear 9c and the internal gear 10b. These gear pumps are parallel to each other. In this arrangement, the idling gears may be omitted as shown in FIG. 6. In FIG. 6, the elements corresponding to those in the first embodiment are denoted by the same reference numerals as in the first embodiment and detailed descriptions thereof are omitted. In this example, filling plate 126 has a sector configurations and is disposed at the position where the idling gears 9c and 9d are disposed in the first embodiment. In this example, the reservoir is formed not in the filling plate 126, but in other places such as the side plates 3a, 3b.

FIG. 7 shows another example of the gear pump arrangement. The elements corresponding to those in the first embodiment are denoted by the same reference numerals as in the first embodiment. In this example, passages 18, 19, 28, and 29 are so disposed as to connect the gear pumps in series. Both in this example and in the example in FIG. 6, the orifices are provided in the outlet passages 18 and 28.

FIGS. 8 to 15 show a second embodiment of the present invention. The members which are the same as those in the first embodiment are denoted by the same reference numerals as in the first embodiment.

Figure 8:
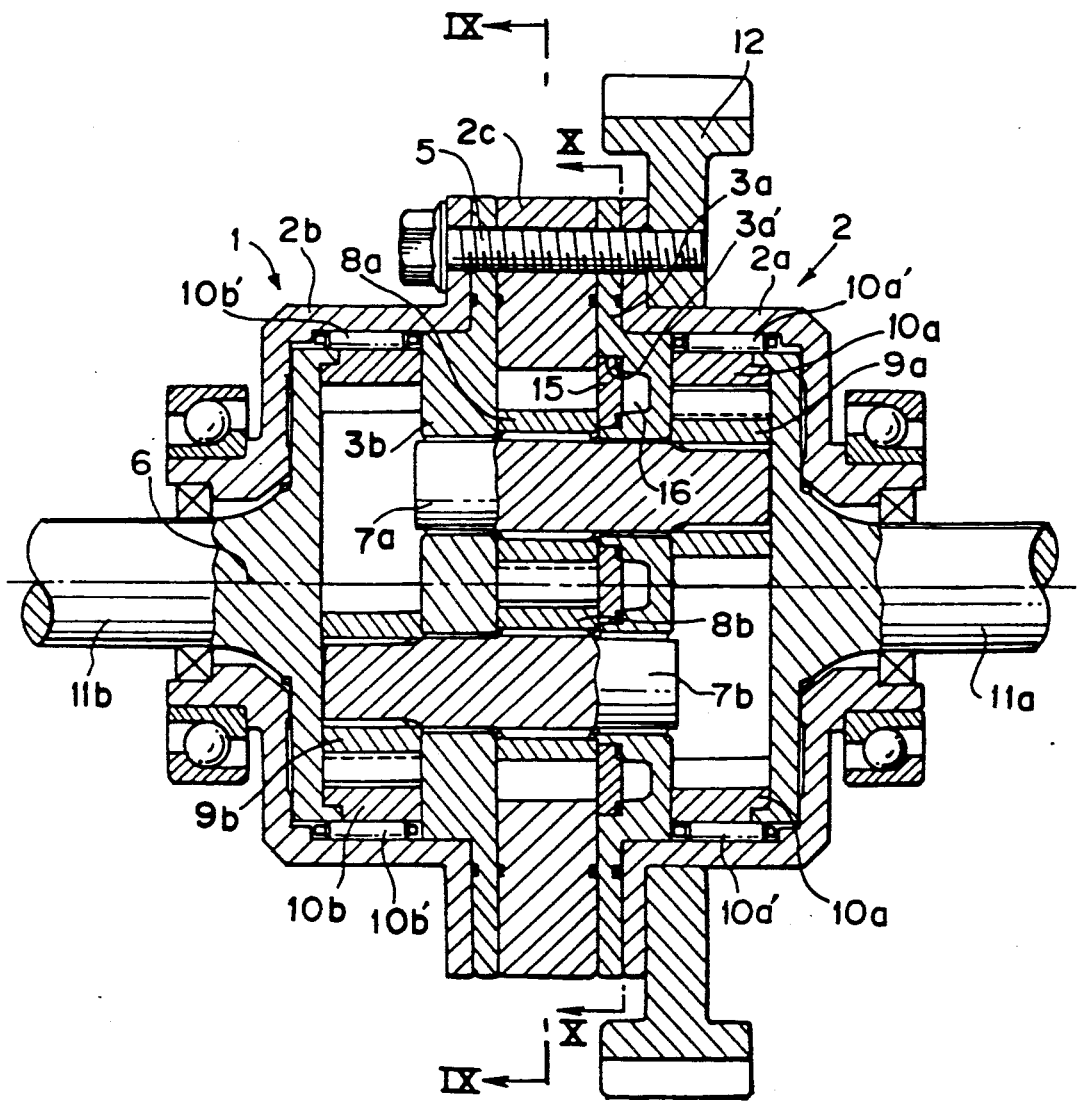
FIG. 8 is a cross sectional view showing a second embodiment of the present invention.

As shown in FIG. 8, the supporting shaft 7a extends through the side plate 3a, protrudes into the case half portion 2a, and is fixed to an external gear 9a disposed in the case half portion 2a. The supporting shaft 7b extends through the side plate 3b, protrudes into the case half portion 2b, and is fixed to an external gear 9b disposed in the case half portion 2b. Internal gears 10a, 10b are respectively disposed in and coaxial with the case half portions 2a, 2b. The internal gears 10a, 10b are rotatably supported at their peripheries respectively by the case half portions 2a, 2b through bearings 10a', 10b'. The gears 9a, 9b intermesh respectively with the internal gears 10a, 10b. Rotation members, or output shafts 11a, 11b, are respectively supported by and coaxial with the case half portions 2a, 2b. The internal gears 10a, 10b are fixed respectively to the output shafts 11a, 11b.

Figure 9:
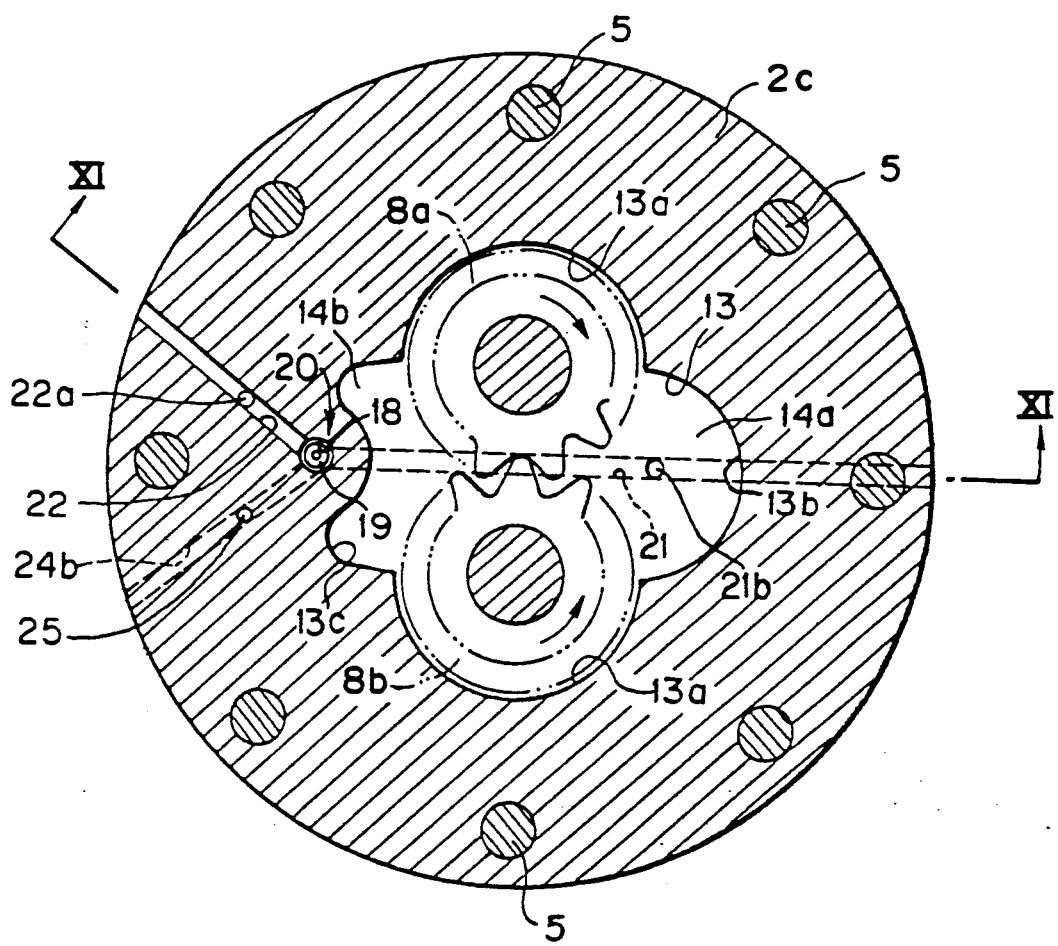
FIG. 9 is a cross sectional view taken along the line IX—IX in FIG. 8.

In this embodiment of the present invention, a gear pump is defined by the gears 8a, 8b so as to define means for restricting the differential motion by using the relative rotations between the gears 8a and 8b. As shown in FIG. 9, a cross shaped hole 13 is formed in the mid plate 2c to define a gear pump by gears 8a and 8b. The hole 13 comprises a pair of semicircular portions 13a, 13a diametrically opposed to each other, and a semicircular portion 13b and a corrugate portion 13c diametrically opposed to each other in the direction normal to the direction from one of the semicircular portions 13a to the other. The pair of gears 8a, 8b are disposed in the pair of semicircular portions 13a, 13a and the semicircular portion 13b and a corrugate portion 13c form chambers 14a and 14b respectively.

Figure 10:
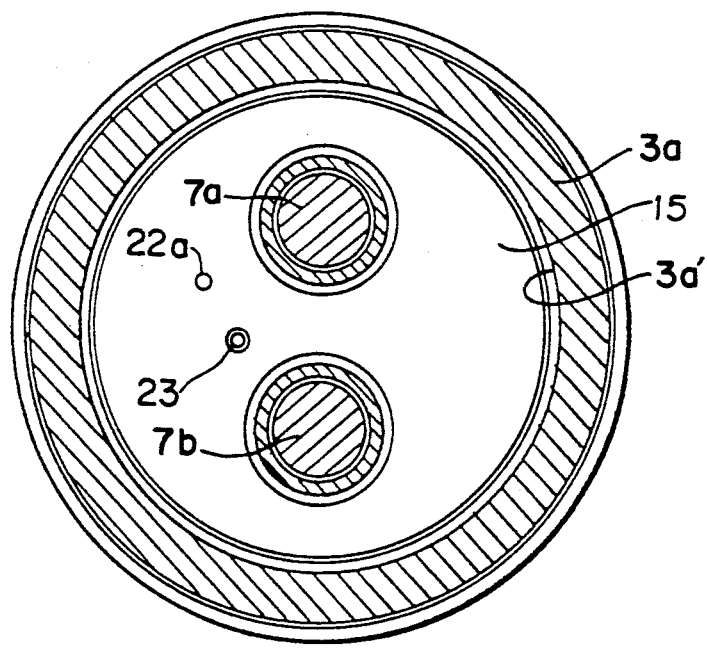
FIG. 10 is a cross sectional view taken along the line X—X in FIG. 9.
Figure 11:
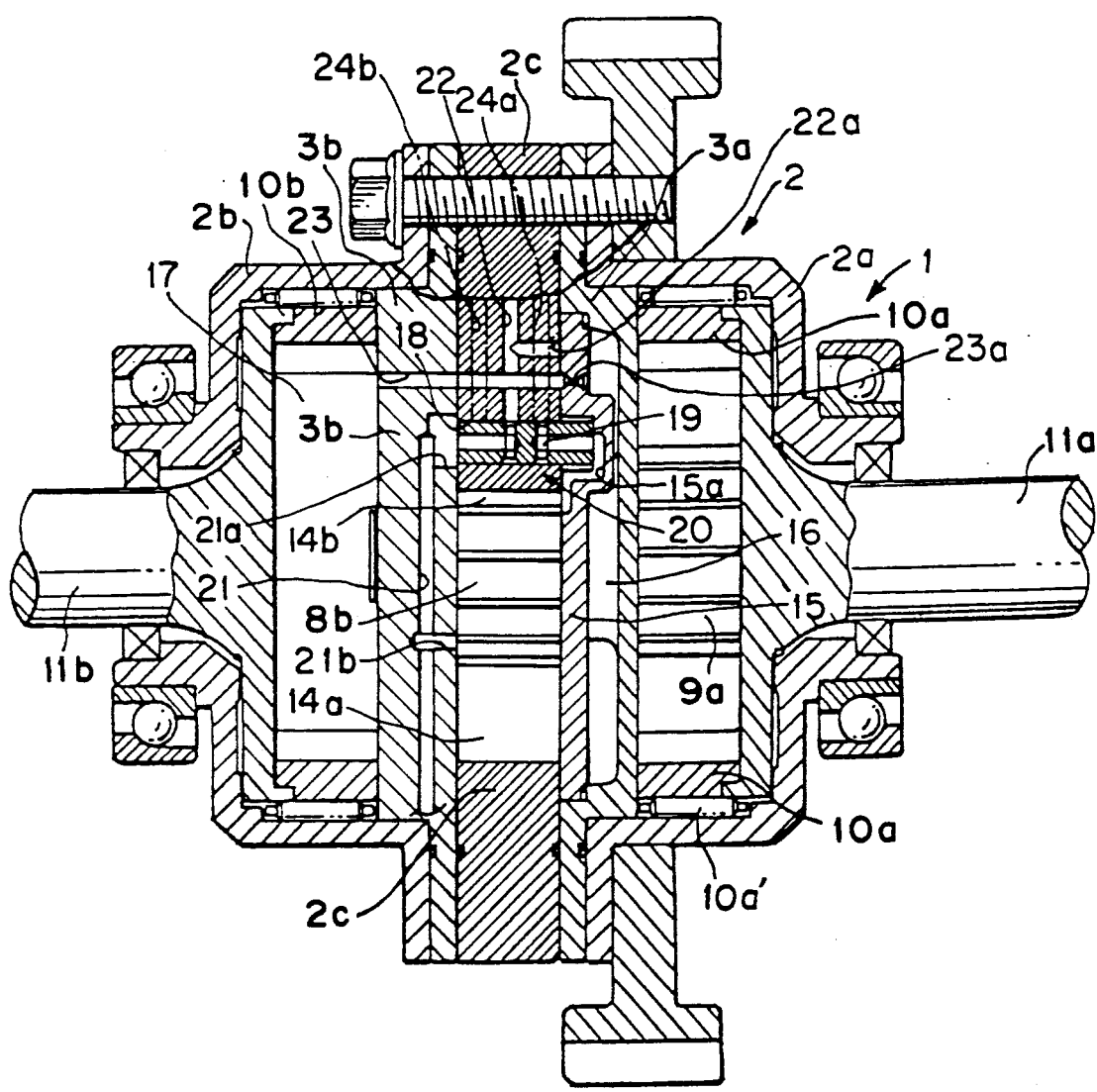
FIG. 11 is a cross sectional view taken along the line XI—XI in FIG. 9.

As shown in FIGS. 8 and 11, the gears 8a, 8b are so disposed as to tightly abut against the side plate 3b at one side. A pressurizing plate 15 is supported by the side plate 3a. As shown in FIG. 10, the pressurizing plate 15 has a disk shape, and is slidablly set in a circular concave portion 3a' formed on the surface of the side plate 3a facing the gears 8a, 8b. The gears 8a, 8b tightly abut against the pressurizing plate 15 at one side. A high pressurized chamber 16 is formed between the pressurizing plate 15 and the side plate 3a.

As shown in FIGS. 9 and 11, the mid plate 2c is provided with a through valve hole 18. A valve spool 19 is disposed in the valve hole 18 slidablly in the axial direction so as to define a switching valve 20. The side plate 3b is provided with a liquid passage 21 extending diametrically. The passage 21 is so disposed as to start from the periphery of the side plate 3b, pass over the center of the side plate 3b and reach to a side of the valve hole 18. The opening at the periphery of the side plate 3b is closed by a plug. The passage 21 is communicated with one end of the valve hole 18 at its one end through a chamber 21a, and is connected to the chamber 14a at its other end through an axial passage 21b.

As shown in FIG. 11, there is formed a channel 15a on the pressurizing plate 15 which opens to the other end of the valve hole 18 and communicates with the chamber 14b. According to this construction, when a high pressure appears in the chamber 14a and a low pressure appears in the chamber 14b, the valve spool 19 is moved by a differential pressure to the right in FIG. 11 and to a first position shown in FIG. 11. When a high pressure appears in the chamber 14b and a low pressure appears in the chamber 14a, the valve spool 19 is moved to the opposite direction to a second position.

In this embodiment, a chamber 17 formed inside of the internal gear 10b defines an oil reservoir, and an operation oil is reserved in the chamber 17. When the gears 8a, 8b rotate on their own axes, the chambers 14a, 14b operate as outlet chambers or inlet chambers in response to the direction of the rotation of the gears 8a, 8b. For example, when the gears 8a, 8b rotate in the direction shown by arrows in FIG. 9, the chamber 14a operates as an outlet chamber and the chamber 14b operates as an intlet chamber. In this situation, the valve spool 19 is in the first position shown in FIG. 11.

As shown in FIG. 11, the mid plate 2c is provided with a liquid passage 22 which opens to an axial mid portion of the valve spool 19. The passage 22 communicates with the high pressurized chamber 16 through an axial passage 22a. A liquid passage 23 extends through the pressurizing plate 15, the mid plate 2c and the side plate 3b, and the passage 23 communicates the high pressurized chamber 16 with the reservoir or the chamber 17. The passage 23 is provided with an orifice 23a so as to load the gear pump defined by the gears 8a, 8b. A flow passage extending from the passage 22 through the axial passage 22a to the high pressurized chamber 16 and further extending from the high pressurized chamber 16 through the passage 23 having the orifice 23a to the reservoir 17 defines an outlet passage of the gear pump. The mid plate 2c is further provided with a pair of liquid passages 24a, 24b which open to the valve hole 18. The liquid passage 24b is located between the passage 22 and the side of the mid plate 2c facing the side plate 3b and the liquid passage 24a is located between the passage 22 and the other side of the mid plate 2c. The liquid passages 24a and 24b are connected to the reservoir 17 through a commom axial passage 25.

Figure 12:
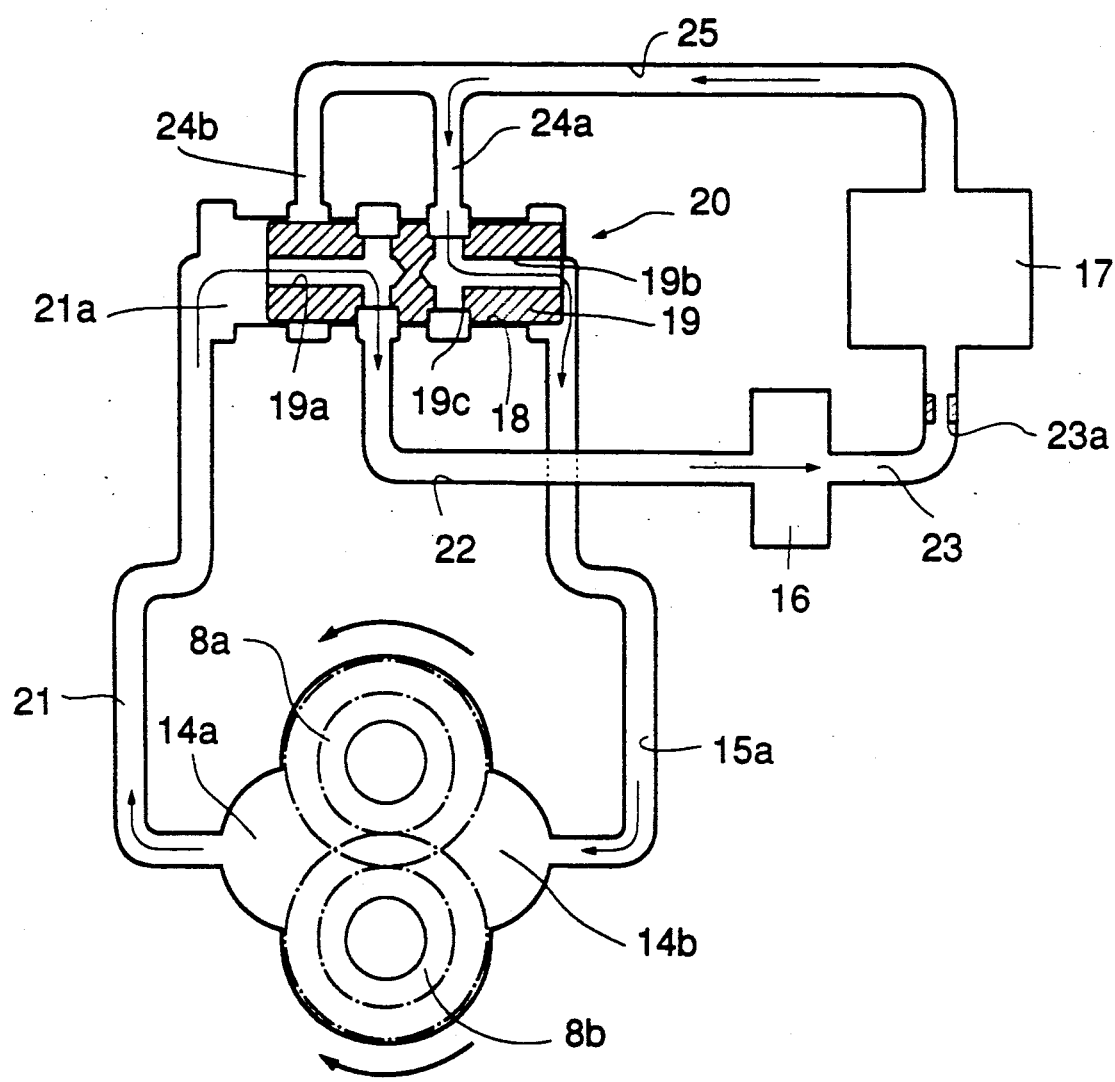
FIGS. 12, 13 are diagrammatic views showing an operation of a switching valve.
Figure 13:
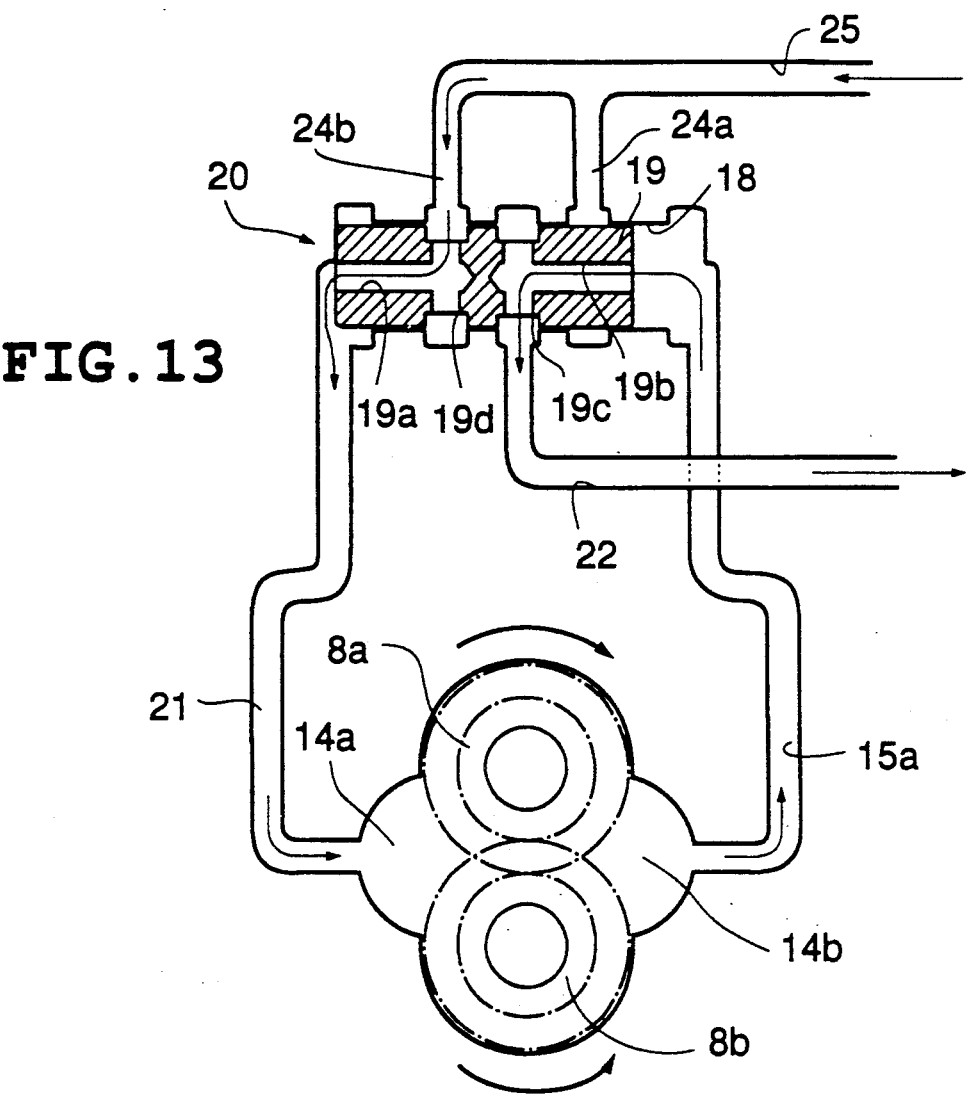

When the valve spool 19 is at the first position in FIG. 11, the chamber 14a of the gear pump is, as shown in FIG. 12, communicated with the passage 22 through the passage 21, chamber 21a and an axial hole 19a of the valve spool 19. In this condition, the chamber 14b of the gear pump is communcated with the passage 24a through the channel 15a, the axial hole 19b of the valve spool 19 and circumferential channel 19c. As a result, the operation oil in the reservoir 17 is lead from the passage 25 through the passage 24a to the switching valve 20, and is further lead from the valve 20 through the channel 15a to the chamber 14b of the gear pump, and is finally sucked into the gear pump. The operation oil discharged from the gear pump is lead from the passage 21 through the chamber 21a to the switching valve 20, and is further lead from the valve 20 through the passage 22 to the high pressurized chamber 16. The high pressurized oil in the chamber 16 is lead to the reservoir 17 through the orifice 23a and the passage 23.

When the direction of the rotation of the gear pump is reversed, the pressure in the chamber 14b becomes high and the pressure in the chamber 14a becomes low. As a result, the valve spool 19 moves to the second position shown in FIG. 13. In this position, the chamber 14a of the gear pump is communicated with the passage 24b through the passage 21, the chamber 21a, the axial hole 19a of the valve spool 19 and the circumferential channel 19d of the valve spool 9. The chamber 14b is communicated with the passage 22 through the channel 15a and the axial hole 19b of the valve spool 19. As a result, the direction of the liquid flow between the gear pump and the switching valve 20 is reversed, but no change occurs in the liquid flow in the inlet passage 25 and the outlet passage 22.

The orifice 23a is formed in the passage 23 so that the highly pressurized operation oil discharged from the outlet chamber meets with resistance when it passes though the orifice 23a. This resistance becomes a load on the gear pump defined by the gears 8a, 8b. The larger the differential rotation between the output shafts 11a and 11b is, and the higher the rotation speeds of the gears 8a, 8b are, the more the resistance of the orifice 23a increases, which operates to restrict the rotation of the gears 8a, 8b. The differential motion of the differential 1 is restricted by this restrictive effect on the rotation. The degree of the restriction of the differential motion can be controlled by changing the size of the orifice 23a.

Figure 14:
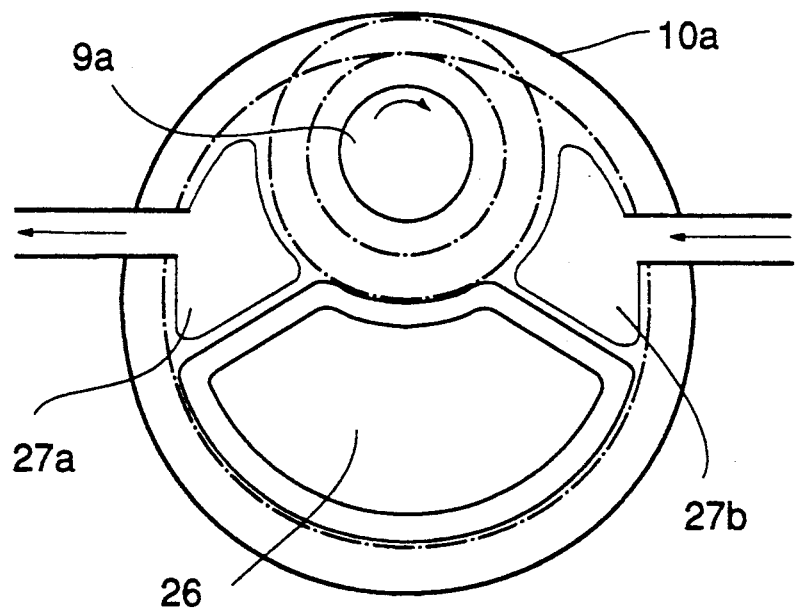
FIG. 14 is a diagrammatic view showing a variation of the second embodiment.

An arrangement for defining a gear pump by the gear 9a and the internal gear 10a is shown in FIG. 14. As shown in FIG. 14, a filling plate 26 is provided so as to fill the space between the gear 9a, and the internal gear 10a. The filling plate 26 is cut out at both ends so that chambers 27a and 27b are provided at both sides of the gear 9a. Thus when the gear 9a rotates in the direction shown by an arrow in FIG. 14, the chamber 27a operates as an outlet chamber and the chamber 27b operates as an inlet chamber. The reservoir may be formed in the filling plate 26. In the same way, a gear pump can be defined by the gear 9b and the internal gear 10b.

Figure 15:
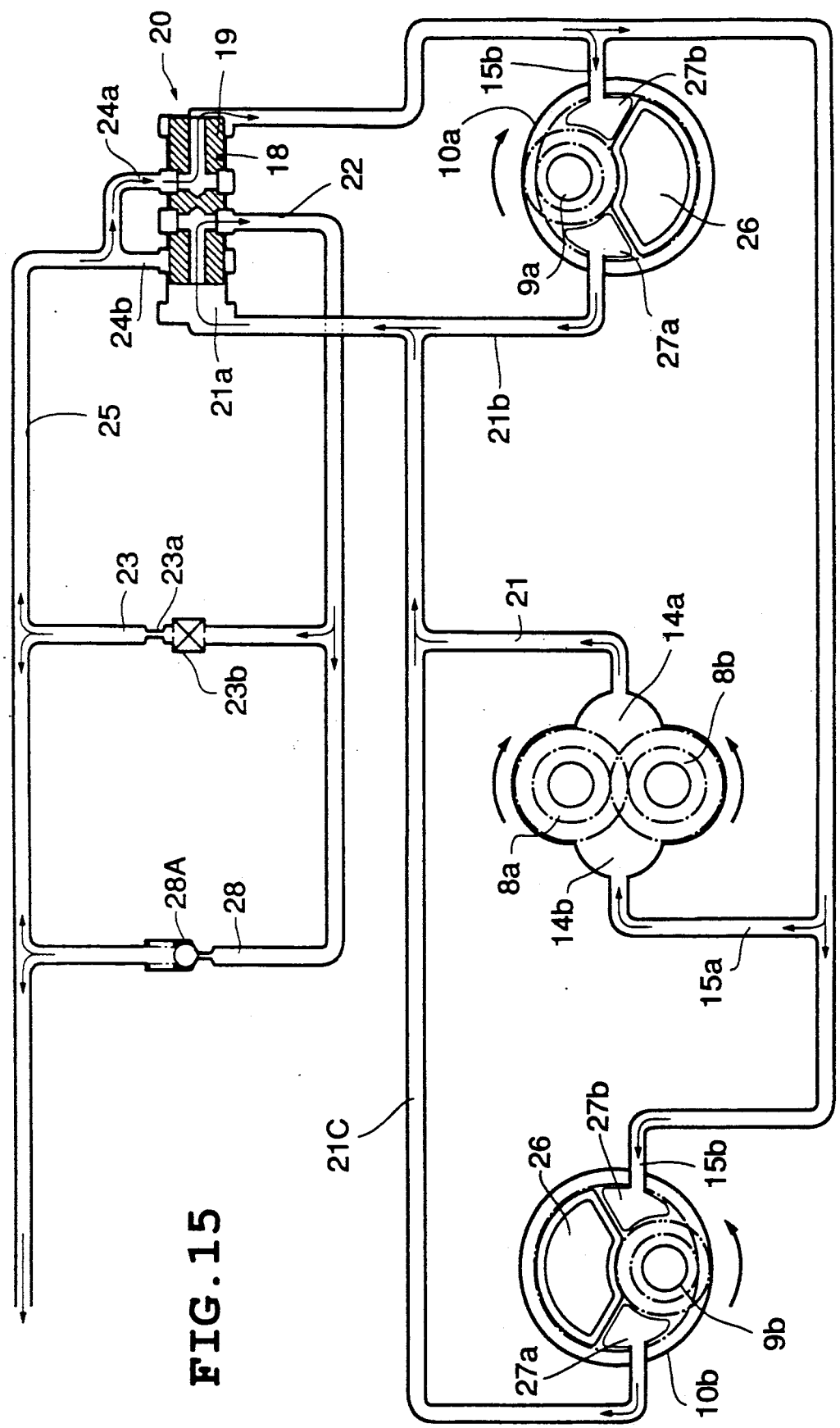
FIG. 15 is a diagrammatic view showing another variation of the second embodiment.

FIG. 15 shows an example of the combination of the gear pump defined by the gears 8a, 8b, the gear pump defined by the gear 9a and the internal gear 10a and the gear pump defined by the gear 9b and the internal gear 10b. The gear pump defined by the gears 8a, 8b is connected to the switching valve 20 in the same way as described above. The gear pump defined by the gear 9a and the internal gear 10a is connected to the chamber 21a disposed at one end of the valve hole 18 through the passage 21b at the chamber 27a and to the channel 15a through the passage 15b at the chamber 27b. In the same way, the gear pump defined by the gear 9b and the internal gear 10b is connected to the chamber 21a through the passage 21c at the chamber 27a and to the channel 15a through the passage 15b at the chamber 27b In this example, a liquid passage 28 is provided parallel to the passage 23 having the orifice 23a and is provided with a relief valve 28a. FIG. 15 shows an operating condition where the gear pumps rotate in the direction indicated by arrows.

FIGS. 16 to 19a show a third embodiment of the present invention. The same members as those in the first embodiment are denoted by the same reference numerals as in the first embodiment.

Figure 17:
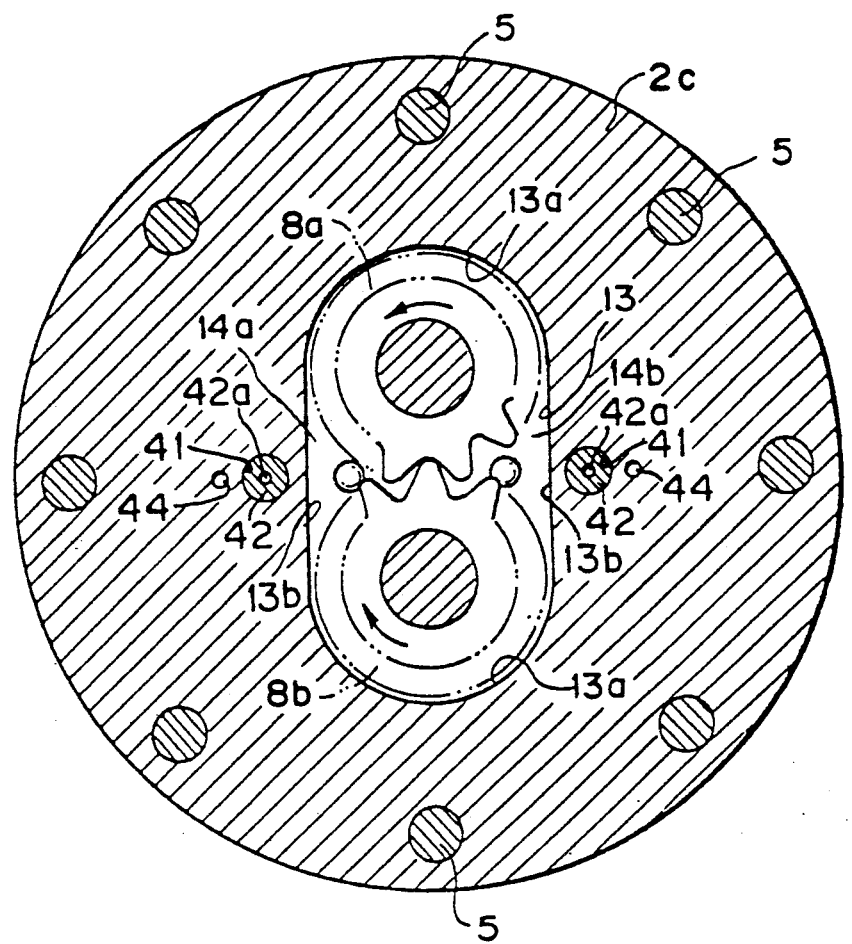
FIG. 17 is a cross sectional view taken along the line XVII—XVII in FIG. 16.

In this embodiment of the present invention, a gear pump is defined by the gears 8a, 8b so as to define means for restricting the differential motion by using the relative rotations between the gears 8a and 8b. As shown in FIG. 17, an oval shaped hole 13 is formed in the mid plate 2c to define a gear pump by gears 8a and 8b. The pair of gears 8a, 8b are disposed in the pair of semicircular portions 13a, 13a, and a pair of straight portions 13b, 13b form chambers 14a and 14b respectively.

Figure 16:
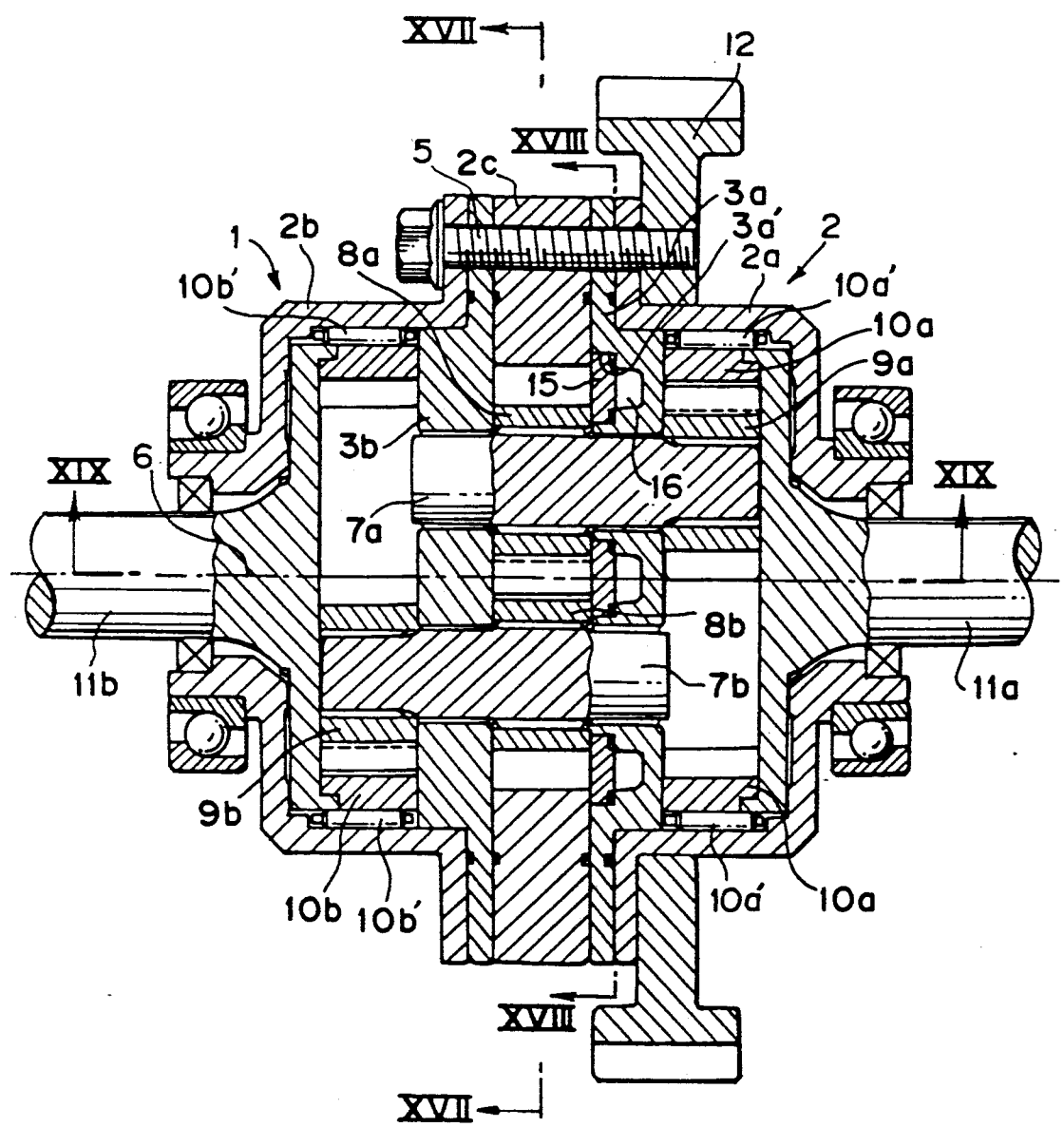
FIG. 16 is a cross sectional view showing a third embodiment of the present invention.
Figure 18:
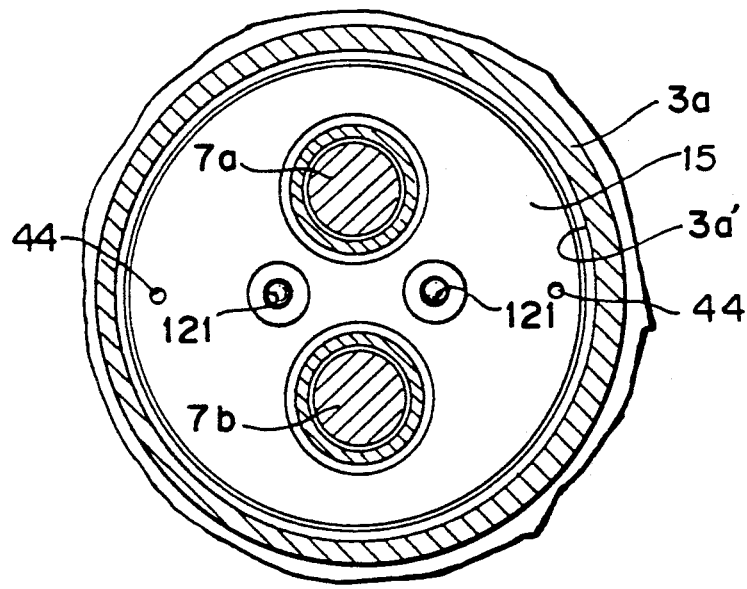
FIG. 18 is a cross sectional view taken along the line XVIII—XVIII in FIG. 16.
Figure 19:
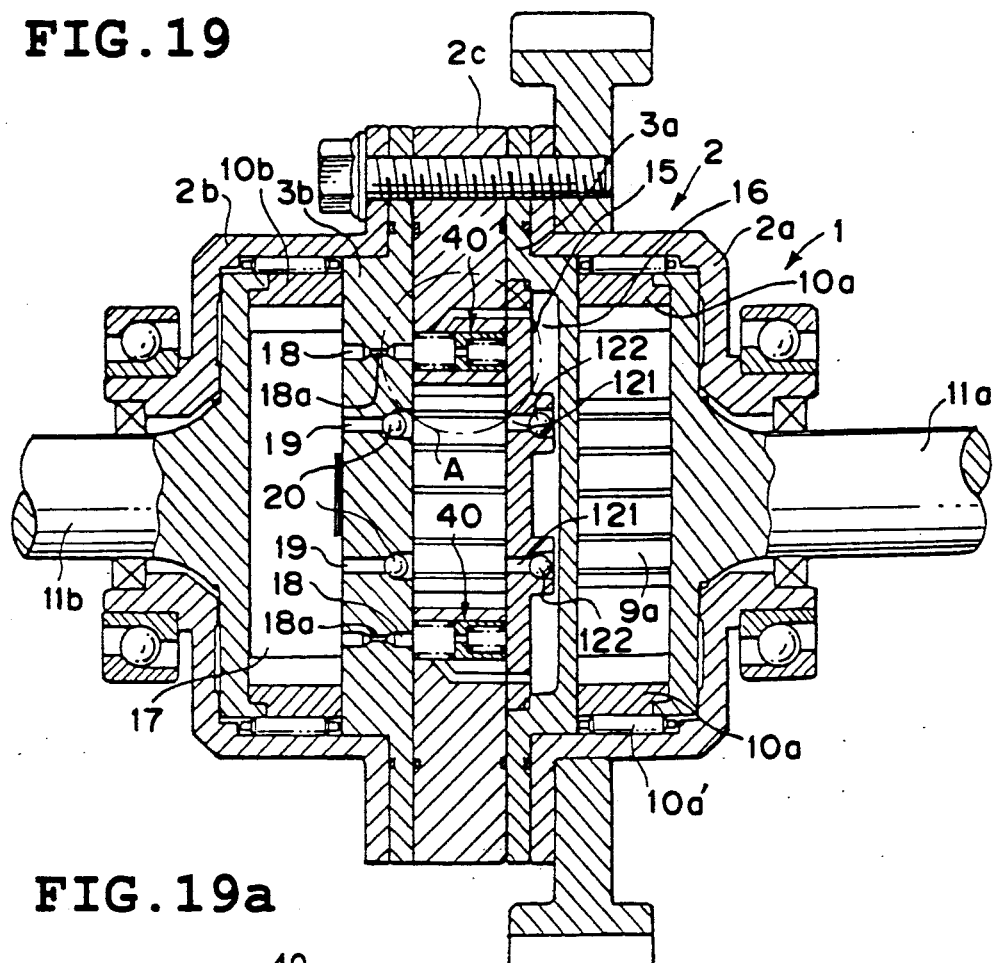
FIG. 19 is a cross sectional view taken along the line XIX—XIX in FIG. 16.
Figure 19A:
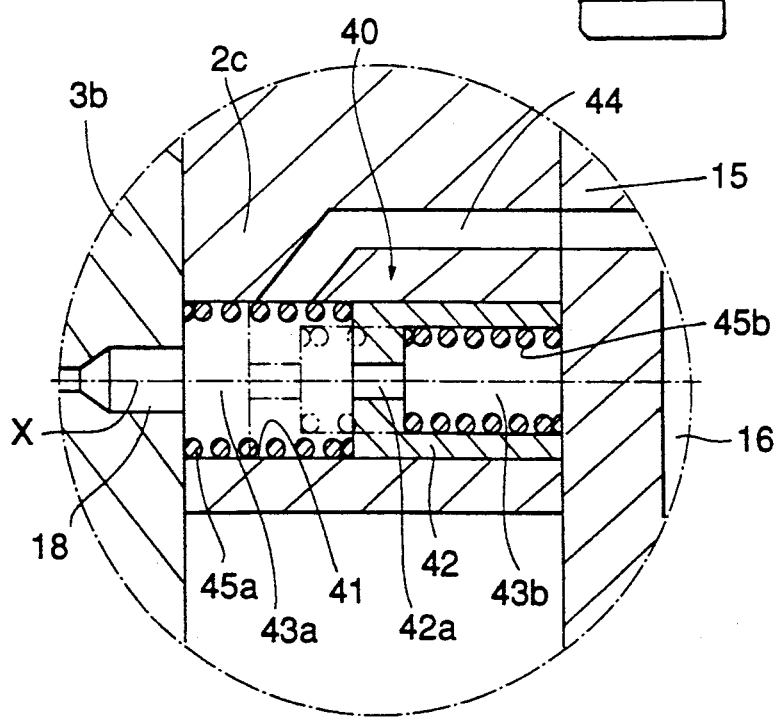
FIG. 19a is an enlarged view of the part marked A in FIG. 19.

As shown in FIGS. 16 and 19, the gears 8a, 8b are so disposed as to tightly abut against the side plate 3b at one side. A pressurizing plate 15 is supported by the side plate 3a. As shown in FIG. 18, the pressurizing plate 15 has a disk shape, and is slidably set in a circular concave portion 3a' formed on the surface of the side plate 3a facing the gears 8a, 8b. The gears 8a, 8b tightly abut against the pressurizing plate 15 at one side. A high pressurized chamber 16 is formed between the pressurizing plate 15 and the side plate 3a.

As shown in FIG. 19, formed in the side plates 3b are outlet passages 18 and inlet passages 19 which communicate with the chambers 14a and 14b, and open to a chamber 17 formed in the gear 10b. The outlet passages 18 are provided with flow restriction means or orifices 18a. The inlet passages 19 are provided with check valves 20 which open only toward the chambers 14a and 14b. The pressurizing plate 15 is provided with communicating passages 121 which communicate the chambers 14a and 14b with the high pressurized chamber 16. The communicating passages 121 are provided with check valves 122 which open only toward the high pressurized chamber 16.

As shown in FIG. 19, the mid plate 2c and the pressurizing plate 15 are provided with valve mechanisms 40 which form flow prohibition means. The construction of the valve mechanism 40 will be described below with reference to FIG. 19a. The mid plate 2c is provided with a through hole 41 coaxially with the outlet passage 18. The hole 41 is closed by the pressurizing plate 15 at one end thereof. A valve 42 having a cylindrical configuration closed at one end thereof is accepted slidably in the through hole 41 in the direction of the axis X of the through hole 41. The valve 42 is provided with a through hole 42a in its closed bottom. The through hole 41 is divided into two portions or a chamber 43a and a chamber 43b by the closed bottom of the valve 42 and the chamber 43a communicates with the chamber 43b through the hole 42a formed in the bottom of the valve 42. The mid plate 2c and the pressurizing plate 15 are provided with a passage 44 parallel to the through hole 41, and the passage 44 opens to a side wall of the chamber 43a at one end thereof and to a surface of the pressurizing plate 15 facing the high pressurized chamber 16 at the other end thereof. A spring 45a is provided in the chamber 43a and a spring 45b is provided in the chamber 43b. The spring 45a biases the valve 42 toward the chamber 43b, and the spring 45b biases the valve 42 toward the chamber 43a. The spring 45a is made from a usual material, while the spring 45b is made from a shape memory alloy.

In this embodiment, a chamber 17 formed inside of the internal gear 10b defines an oil reservoir, and an operational oil is reserved in the chamber 17. When the gears 8a, 8b rotate on their own axes, the chambers 14a, 14b operate as outlet chambers or inlet chambers in response to the direction of the rotation of the gears 8a, 8b. For example, when the gears 8a, 8b rotate in the direction shown by arrows in FIG. 17, the chamber 14b operates as an outlet chamber and the chamber 14a operates as an inlet chamber. The pressure in the outlet chamber is transmitted to the high pressurized chamber 16 through the communicating passage 121 and this pressure forces the pressurizing plate 15 against the side surfaces of the gears 8a, 8b. By the above operation of the pressurizing plate 15, sealing between the side surfaces of the gears 8a, 8b and the pressurizing plate 15 is achieved.

High pressurized oil in the outlet chamber is lead to the reservoir or chamber 17 through the communicating passage 121, the high pressurized chamber 16, the passage 44, the chamber 43a and the outlet passage 18. The operation oil is lead from the reservoir or chamber 17 through the inlet passage 19 to the inlet chamber.

The orifice 18a is formed in the passage 18 so that the highly pressurized operation oil discharged from the outlet chamber meets with resistance when it passes though the orifice 18a. This resistance becomes a load on the gear pump defined by the gears 8a, 8b. The larger the differential rotation between the output shafts 11a and 11b is, and the higher the rotation speeds of the gears 8a, 8b are, the more the resistance of the orifice 18a increases, which operates to restrict the rotation of the gears 8a, 8b. The differential motion of the differential 1 is restricted by this restrictive effect on the rotation. The degree of the restriction of the differential motion can be controlled by changing the size of the orifice 18a.

When the differential rotation between the output shafts 11a and 11b increases in spite of the restrictive effect of the orifice 18a on the differential motion and the temperature of the operation oil exceeds a predetermined value, the spring 45b made from a shape memory alloy elongates so as to move the valve 42 toward the chamber 43a. As the oil pressure in the chamber 43a is equal to that in the chamber 43b because of the presence of the through hole 42a in the bottom of the valve 42, the valve 42 smoothly moves toward the chamber 43a in response to the elogation of the spring 45b. In accordance with the movement of the valve 42 toward the chamber 43a, the opening of the passage 44 to the side wall of the chamber 43a is closed by the side wall of the valve 42, and the discharge of the operation oil from the high pressurized chamber 16 and the chamber 14b to the chamber 17 is prohibited so that the differential 1 is locked.

FIGS. 20 to 23a show a fourth embodiment of the present invention. The same members as those in the first embodiment are denoted by the same reference numerals as in the first embodiment.

Figure 21:
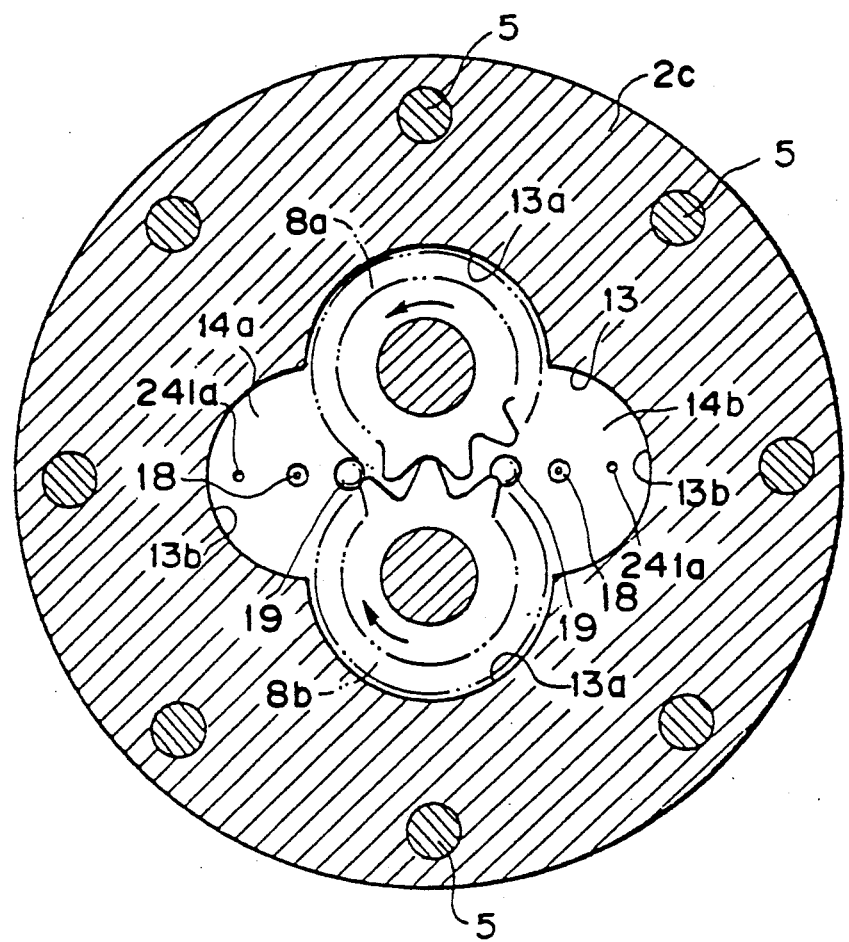
FIG. 21 is a cross sectional view taken along the line XXI—XXI in FIG. 20.

In this embodiment of the present invention, a gear pump is defined by the gears 8a and 8b so as to define means for restricting the differential motion between the shafts 11a and 11b using the relative rotations between the gears 8a and 8b. As shown in FIG. 21, a cross shaped hole 13 is formed in the mid plate 2c to define a gear pump by gears 8a and 8b. The hole 13 comprises the pair of semicircular portions 13a, 13a diametrically opposed to each other and a pair of semicircular portions 13b, 13b diametrically opposed to each other in the direction normal to the direction from one of the semicircular portions 13a to the other. The pair of gears 8a, 8b are disposed respectively within the pair of semicircular portions 13a, 13a and the pair of semicircular portions 13b, 13b form the chambers 14a and 14b.

Figure 20:
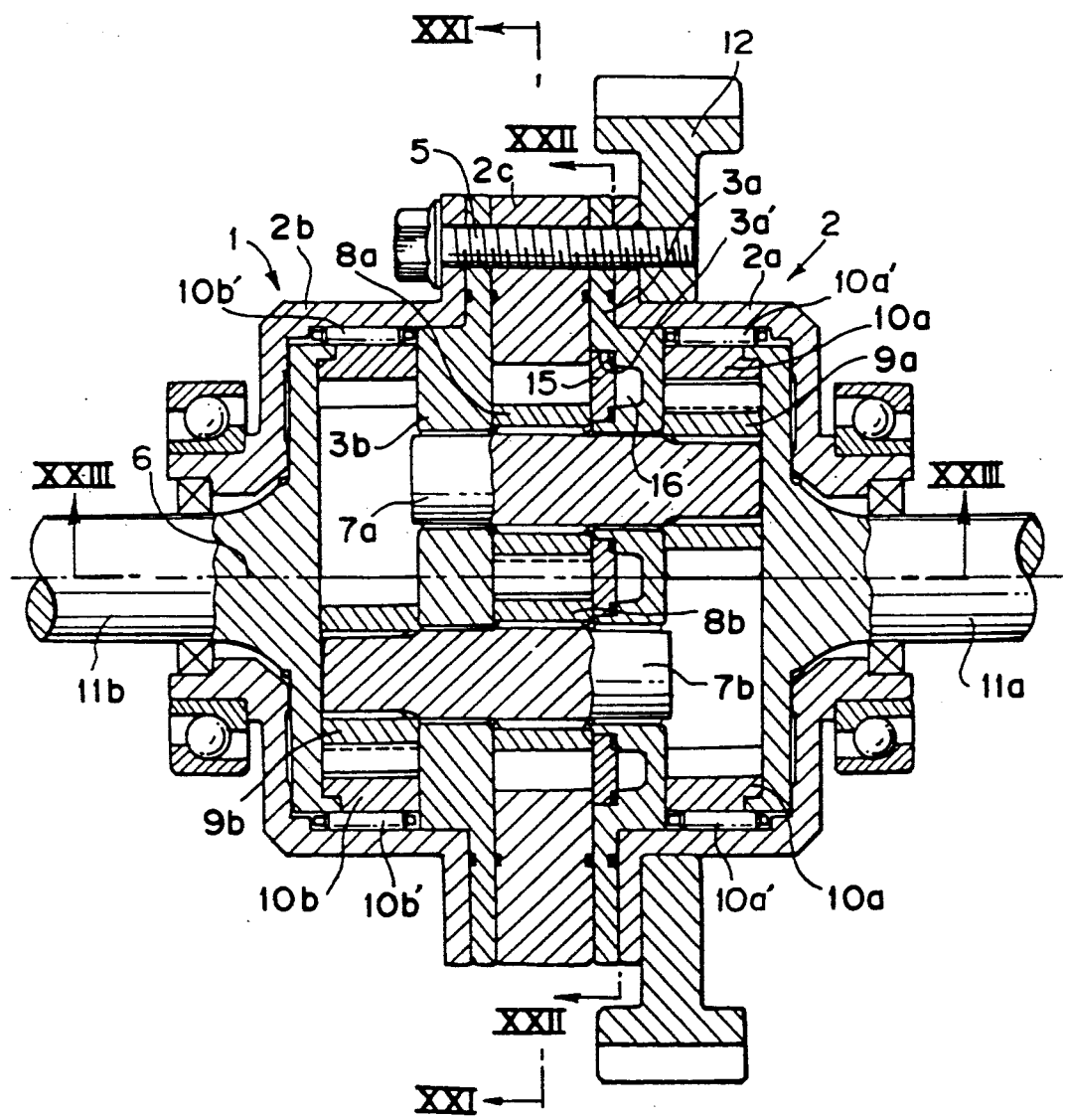
FIG. 20 is a cross sectional view showing a fourth embodiment of the present invention.
Figure 22:
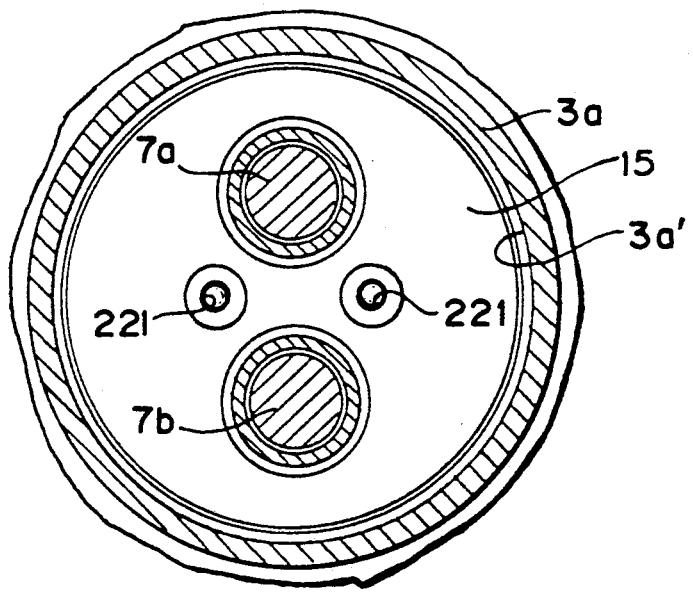
FIG. 22 is a cross sectional view taken along the line XXII—XXII in FIG. 20.
Figure 23:
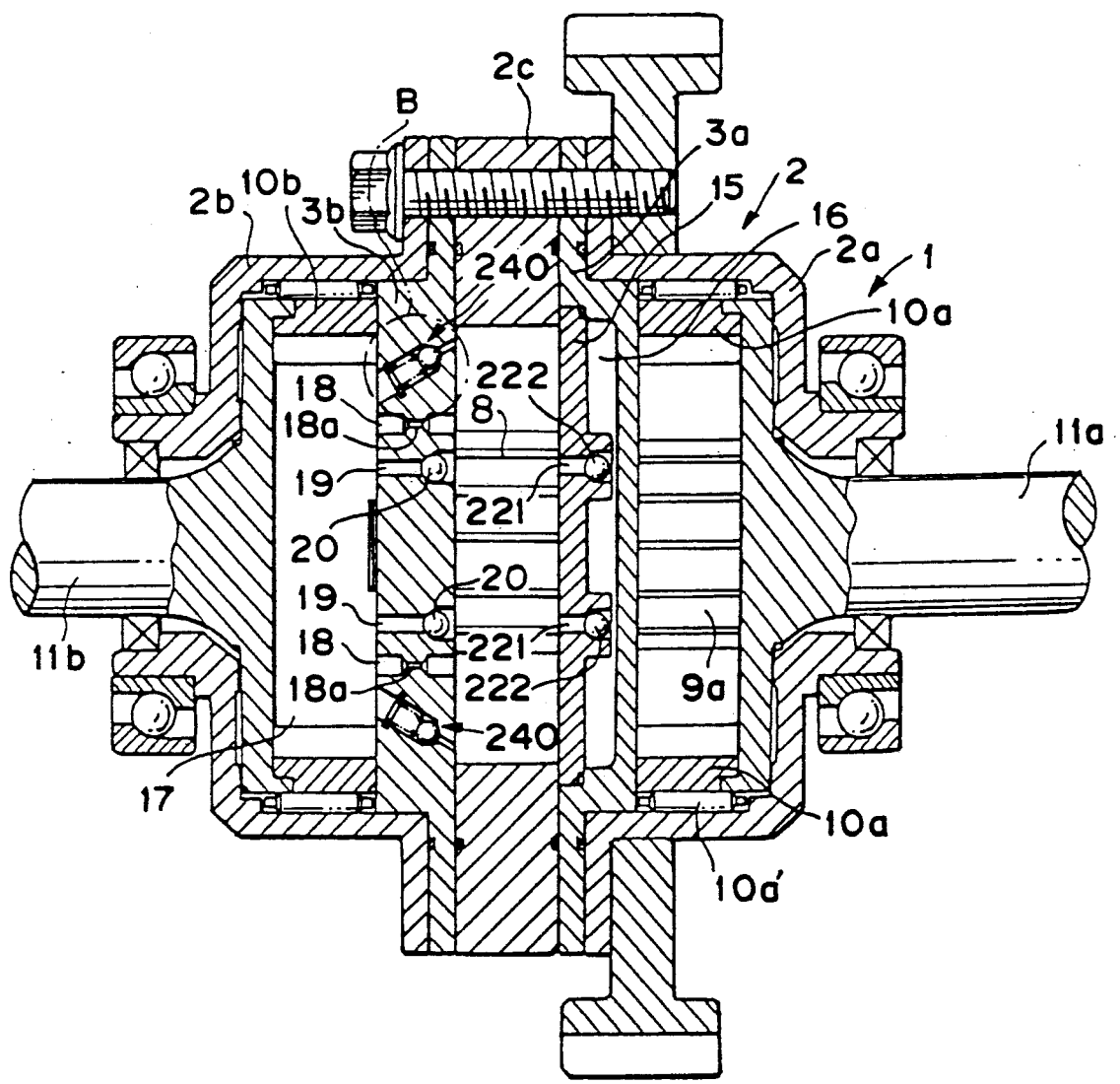
FIG. 23 is a cross sectional view taken along the line XXIII—XXIII in FIG. 20.

As shown in FIGS. 20 and 23, the gears 8a, 8b are so disposed as to tightly abut against the side plate 3b at one side. A pressurizing plate 15 is supported by the side plate 3a. As shown in FIG. 22, the pressurizing plate 15 has a disk shape, and is slidably set in a circular concave portion 3a' formed on the surface of the side plate 3a facing the gears 8a, 8b. The gears 8a, 8b tightly abut against the pressurizing plate 15 at one side. A high pressurized chamber 16 is formed between the pressurizing plate 15 and the side plate 3a.

As shown in FIG. 23, formed in the side plate 3b are the outlet passages 18 and the inlet passages 19 which communicate with the chambers 14a and 14b and open to the chamber 17 formed in the gear 10b. The outlet passages 18 are provided with flow restriction means or the orifices 18a. The inlet passages 19 are provided with the check valves 20 which open only toward the chambers 14a and 14b. The pressurizing plate 15 is provided with the communication passages 221 which communicate the chambers 14a and 14b with the high pressurized chamber 16. The communication passages 221 are provided with the check valves 222 which open only toward the high pressurized chamber 16.

Figure 23A:
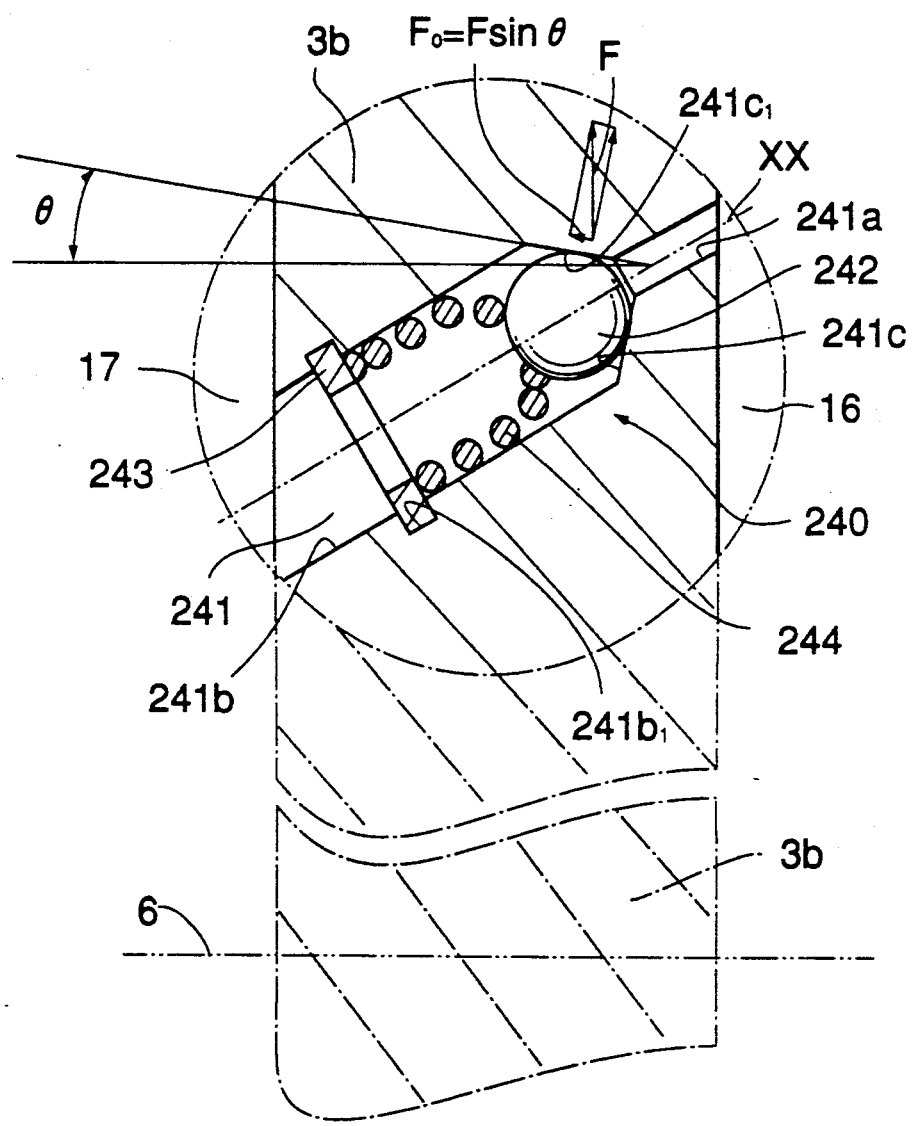
FIG. 23a is an enlarged view of the part marked B in FIG. 23.

The side plate 3b is further provided with valve mechanisms 240 which form means for changing discharge pressure. The construction of the valve mechanism 240 will be described hereinafter with reference to FIG. 23a. The side plate 3b is provided with a communication passage 241 which communicates with the chambers 14a and 14b, and opens to the chamber 17 in the gear 10b. The communication passage 241 comprises a circular hole with small diameter 241a opening to the chambers 14a and 14b, a circular hole with large diameter 241b opening to the chamber 17 and a conical hole 241c connecting the hole 241a with the hole 241b. The holes 241a, 241b and 241c are disposed coaxially to each other around an axis XX. As shown in FIG. 23a, the conical hole 241c is so disposed such that, on a plane including the axis XX and the center axis 6 of the case half portion 2a, the generating line 241c₁ of the conical hole 241c distal to the center axis 6 of the case half portion 2a inclines at an angle of θ to the axis 6. An annular member 243 is snapped into an annular channel 241b₁ formed in the side wall of the large diameter hole 241b. A spring 244 disposed in the large diameter hole 241b to abut on the annular member 243 at one end thereof forces a spherical valve 242 for changing the discharge pressure against the side wall of the conical hole 241c so as to close the communication passage 241.

In this embodiment, the chamber 17 formed inside of the internal gear 10b defines an oil reservoir, and an operation oil is reserved in the chamber 17. When the gears 8a, 8b rotate on their own axes, the chambers 14a, 14b operate as outlet chambers or inlet chambers in response to the direction of the rotation of the gears 8a, 8b. For example, when the gears 8a, 8b rotate in the direction shown by arrows in FIG. 21, the chamber 14b operates as an outlet chamber and the chamber 14a operates as an inlet chamber. The pressure in the outlet chamber is transmitted to the high pressurized chamber 16 through the communicating passage 221 and this pressure forces the pressurizing plate 15 against the side surface of the gears 8a, 8b. By the above operation of the pressurizing plate 15, sealing between the side surfaces of the gears 8a, 8b and the pressurizing plate 15 is achieved.

High pressurized oil in the outlet chamber is lead to the reservior or chamber 17 through the outlet passage 18. The operation oil is lead from the reservoir or chamber 17 through inlet passage 19 to the inlet chamber.

The orifice 18a is formed in the passage 18 so that the highly pressurized operation oil discharged from the outlet chamber meets with resistance when it passes though the orifice 18a. This resistance becomes a load on the gear pump defined by the gears 8a, 8b. The larger the differential rotation between the output shafts 11a and 11b is, and the higher the rotation speeds of the gears 8a, 8b are, the more the resistance of the orifice 18a increases, which operates to restrict the rotation of the gears 8a, 8b. The differential motion of the differential 1 is restricted by this restrictive effect on the rotation. The degree of the restriction of the differential motion can be controlled by changing the size of the orifice 18a.

A centrifugal force F expressed in the following formula works on the spherical valve 242 during the driving of a car.

$$F = mr\omega^2$$

m: mass of the sperical valve 242
r: distance between the center axis 6 of the case half portion 2a and the center of gravity of the valve 42
ω: angular velocity of the case half portion 2a An inertia force F₀ expressed in the following formula, a component of the centrifugal force F, works on the spherical valve 242 so as to bias the valve 242 toward the chamber 17 along a generating line 241c₁.

$$F_0 = F \sin \theta$$

When the travelling speed of the car and the angular velocity of the case half portion 2a increase, and the inertia force F₀ overcomes a statical friction force f working on the valve 242 from the surface of the side wall of the conical hole 241c near the generating line 241c₁ under the biasing force of spring 244, the valve 242 moves toward the chamber 17 along the generating line 241c₁. The spring 244 contracts in response to the movement of the valve 242 and the statical friction force f increases. When the statical friction force f balances with the inertia force F₀, the valve 242 stops. When the travelling speed of the car further increases, the valve 242 further moves toward the chamber 17 along the generating line 241c₁.

Thus, when the travelling speed of the car exceeds a predetermined value, the passage 241 closed by the valve 242 is opened. After the the passage 241 is opened, the operation oil in the high pressurized chamber 16 begins to flow into the chamber 17 through the communication passage 241. The operation oil flowing from the high pressurized chamber 16 through the communication passage 241 into the chamber 17 increases in response to the increase of the travelling speed of the car. As a result, the discharge pressure of the gear pump begins to decrease when the travelling speed of the car exceeds a predetermined value, and the discharge pressure of the gear pump decreases even more as the travelling speed of the car increases.

Figure 24:
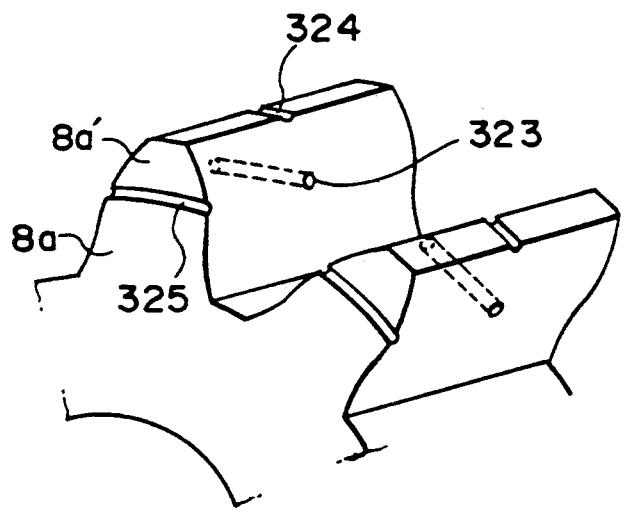
FIG. 24 is a perspective view showing another example of the means for restricting the flow of the operation oil of the gear pump.

FIG. 24 shows another embodiment of the flow restriction means. The flow restriction means in the above embodiments comprises the orifices disposed in the outlet passages. In FIG. 24, the flow restriction means comprises through holes with small diameter 323 disposed in teeth 8a' of the gear 8a, or channels 324 disposed on the tips of teeth 8a', or channels 325 disposed on the side surfaces of teeth 8a'. In this embodiment, the degree of the restriction of the differential motion can be controlled by changing the size of the holes 323 or the channels 324, 325. This flow restriction means can be used instead of the orifice 18a in the aforementioned embodiments and can also be used with the orifice 18a. When this flow restriction means is used instead of the orifice 18a the outlet passage 18 is not necessary, but the inlet passage 19 is preferably disposed so as to compensate for the leaking of the operation oil from the gear pump. In this flow restriction means, the resistance against the leaking of the operation oil through the holes 323 or the channels 324, 325 becomes a load on the gear pump. In the same manner as in the aforementioned embodiments, the load on the gear pump is very low when the rotation speed of the gears 8a, 8b is low and the load becomes higher as the rotation speed of the gears 8a, 8b becomes higher. Thus, in the same way as in the aforementioned embodiments, the gear pump operates as a means for restricting the differential motion.

Figure 25:
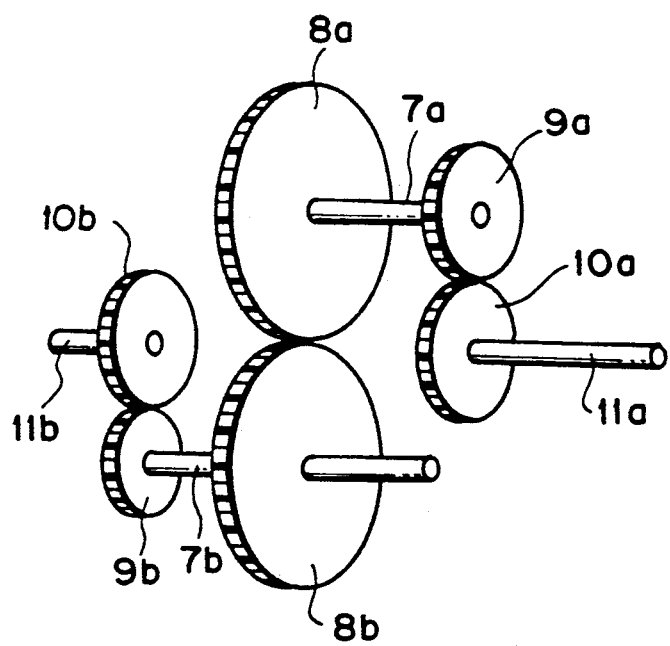
FIG. 25 is a perspective view showing another example of the gear arrangement of the differential.

FIG. 25 shows another embodiment of the gears 10a, 10b. In this embodiment, the gears 10a, 10b fixed respectively to the output shafts 11a, 11b are formed as external gears. In this arrangement, gear pumps can be defined by the gears 8a and 8b, or gears 9a and 10a, or gears 9b and 10b or two or more of the above pairs.

In the aforementioned embodiments, the number of teeth of each gears may be determined such that the gear ratio of the gear train defined by the case 2, the gear 8a, the gear 9a and the gear 10a is different from that of the gear train defined by the case 2, the gear 8b, the gear 9b and the gear 10b. By this construction, the input torque on the differential 1 can be distributed to the output shafts 11a, 11b with a predetermined distribution ratio.

In the aforementioned embodiments, change-gear mechanisms may be defined by the intermeshing gears 9a, 10a and the intermeshing gears 9b, 10b. The degree of the restriction of the differential motion by the gear pump can be controlled by controlling the gear ratio of the change-gear mechanisms. When the gears 9a and 10a define a reduction gear from the supporting shaft 7a to the output shaft 11a and the gears 9b and 10b define a reduction gear from the supporting shaft 7b to the output shaft 11b, the gear pump defined by the intermeshing gears 8a, 8b rotates at higher speed than the output shafts 11a, 11b. Thus, the restrictive effect on the differential motion can be sufficiently achieved even by a small gear pump.

Figure 26:
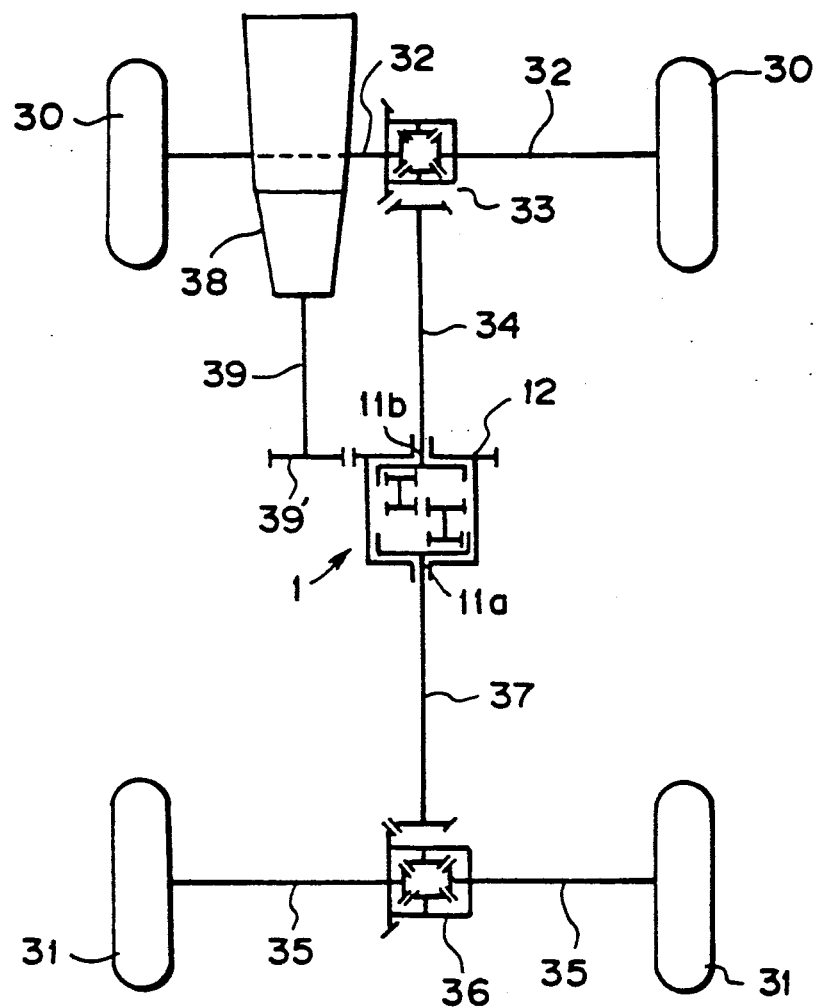
FIG. 26 is a diagrammatic view showing a four wheel drive car having a differential in accordance withe the present invention.

FIG. 26 shows a car having the differential 1 in accordance with the present invention. The car is a four-wheel drive car and has a pair of front wheels 30 and a pair of rear wheels 31. The front wheels 30 are connected to a front axle 32 which is connected to a front propeller shaft 34 through a front differential 33. The front propeller shaft 34 is connected to the output shaft 11b of the differential 1 in accordance with the present invention. In the same way, the rear wheels 31 are connected to a rear axle 35 which is connected to a rear propeller shaft 37 through a rear differential 36. The rear propeller shaft 37 is connected to the output shaft 11a of the differential 1. The gear train of the differential 1 from the input gear 12 to the output shaft 11b has a higher gear ratio than that of the gear train from the input gear 12 to the output shaft 11a.

An engine 38 is disposed in the front portion of the body of the car and has a driving shaft 39. The driving shaft 39 is fixed to a driving gear 39' at one end thereof. The driving gear 39' meshes with the input gear 12 of the differential 1. In the above arrangement, a differential motion between the front axle 32 and the rear axle 35 is assured by the differential 1. The gear pumps disposed in the differential 1 operate so as to prevent the differential motion from becoming too large. The torque distribution to the front propeller shaft 34 is lower than that to the rear propeller shaft 37.

We claim:

1. A differential for use in a car comprising:
a case rotatable around an axis;
an input gear fixed to the case coaxially with the axis of the case;
a pair of output shafts which are rotatably supported by the case coaxially with the axis of the case and protrude from opposite ends of the case;
a pair of intermeshing first gears disposed in the case at opposite sides of the axis of the case and rotatably supported by the case;
a pair of second gears disposed in the case, one of said second gears being located at one side of and coaxial with one of the first gears and rotatable integrally with said one of the first gears, the other of said second gears being located at the other side of and coaxial with the other one of the first gears and rotatable integrally with said other one of the first gears;
a pair of third gears disposed in the case coaxially with the axis of the case, one of said third gears rotatable integrally with one of the output shafts and intermeshing with one of the second gears, the other of said third gears rotatable integrally with the other of the output shafts and intermeshing with the other of the second gears;
at least one gear pump defined by at least one of the pairs of intermeshing gears, said gear pump having two chambers, one of which operates as an inlet chamber and the other of which operates as an outlet chamber in response to the direction of the rotation of the gears;
means for restricting a flow of an operation oil of the gear pump so as to generate a load on the gear pump, said gear pump and said means for restricting the flow of the operation oil of the gear pump defining means for restricting a differential motion of said differential; and
a pair of idling gears in the case, one of said idling gears being located coaxially with one of the second gears at the opposite side of the first gear with which said second gear is rotatable integrally, the other of said idling gears being located coaxially with the other of the second gears at the opposite side of the first gear with which said second gear is rotatable integrally, each of said idling gears intermeshing, respectively, with a corresponding one of the third gears, one gear pump being defined by each pair of intermeshing gears.

2. A differential for use in a car comprising:

a case rotatable around an axis;

an input gear fixed to the case coaxially with the axis of the case;

a pair of output shafts which are rotatably supported by the case coaxially with the axis of the case and protrude from opposite ends of the case;

a pair of intermeshing first gears disposed in the case at opposite sides of the axis of the case and rotatably supported by the case;

a pair of second gears disposed in the case, one of said second gears being located at one side of and coaxially with one of the first gears and rotatable integrally with the one of the first gears, the other of said second gears being located at the other side of and coaxially with the other of the first gears and rotatable integrally with the other of the first gears;

a pair of third gears disposed in the case coaxially with the axis of the case, one of said third gears rotatable integrally with one of the output shafts and intermeshing with one of the second gears, the other of said third gears rotatable integrally with the other of the output shafts and intermeshing with the other of the second gears;

a pair of idling gears in the case, one of said idling gears being located coaxially with one of the second gears at the opposite side of the first gear with which said second gear is rotatable integrally, the other of said idling gears being located coaxially with the other of the second gears at the opposite side of the first gear with which said second gear is rotatable integrally;

each of said idling gears intermeshing respectively with a corresponding one of the third gears;

gear pumps, each of which is defined by a pair of intermeshing gears and has two chambers, one of which operates as an inlet chamber and the other of which operates as an outlet chamber in response to the direction of the rotation of the gears; and means for restricting a flow of an operation oil of each gear pump so as to generate a load on each gear pump, said gear pumps and said means for restricting the flow of the operation oil of each said gear pump defining means for restricting a differential motion of said differential.

3. A differential in accordance with claim 2, wherein said second gears are external gears and said third gears are internal gears.

4. A differential in accordance with claim 2, wherein said second gears and said third gears are external gears.

5. A differential in accordance with claim 2, wherein said means for restricting the flow of an operation oil of each said gear pump comprises through holes formed in the teeth of the gears which define each said gear pump.

6. A differential in accordance with claim 2, wherein said means for restricting the flow of the operation oil of each said gear pump comprises channels formed on the teeth of the gears which define each said gear pump.

7. A differential in accordance with claim 2, wherein said gear pumps are communicated in series with each other.

8. A differential in accordance with claim 2, wherein said gear pumps are communicated in parallel with each other.

9. A differential in accordance with claim 2, wherein a gear train defined by the gears which connect the case to one of the output shafts has a different gear ratio from that of a gear train defined by the gears which connect the case to the other of the output shafts.

10. A differential in accordance with claim 2, wherein said first, second and third gears define a speed reduction mechanism between the input gear and the output shafts, which speed reduction mechanism transmits a torque from the input gear to the output shafts at a reduced rotation speed.

11. A four wheel drive car including a front axle having a pair of front wheels at opposite ends thereof, a rear axle having a pair of rear wheels at opposite ends thereof, and an engine having a driving shaft, said driving shaft being connected to said front axle and said rear axle through a differential disposed between said front axle and said rear axle, said differential comprising:

a case, rotatable around an axis;

an input gear fixed to the case coaxially with the axis of the case;

a pair of output shafts which are rotatably supported by the case coaxially with the axis of the case and protrude from opposite ends of the case;

a pair of intermeshing first gears disposed in the case at opposite sides of the axis of the case and rotatably supported by the case;

a pair of second gears disposed in the case, one of said second gears being located at one side of and coaxially with one of the first gears and rotatable integrally with this first gear, the other of said second gears being located at the other side of and coaxially with the other of the first gears and rotatable integrally with the other of the first gears;

a pair of third gears disposed in the case coaxially with the axis of the case, one of said third gears rotatable integrally with one of the output shafts and intermeshing with one of the second gears, the other of said third gears rotatable integrally with the other of the output shafts and intermeshing with the other of the second gears;

a pair of idling gears in the case, one of said idling gears being located coaxially with one of the second gears at the opposite side of the first gear with which said second gear is rotatable integrally, the other of said idling gears being located coaxially with the other of the second gears at the opposite side of the first gear with which said second gear is rotatable integrally;

each of said idling gears intermeshing, respectively, with a corresponding one of the third gears;

gear pumps, each of which is defined by a pair of intermeshing gears and has two chambers, one of which operates as an inlet chamber and the other of which operates as an outlet chamber in response to the direction of the rotation of the gears; and means for restricting a flow of an operation oil of each gear pump so as to generate a load on each gear pump, said gear pumps and said means for restricting the flow of the operation oil of each gear pump defining means for restricting a differential motion of said differential, a gear train defined by the gears which connect the case to one of the output shafts having a different gear ratio from a gear train defined by the gears which connect the case to the other of the output shafts, one of said output shafts of the differential connected to the gear train having the higher gear ratio being connected to the front axle and the other of said output shafts of the differential connected to the gear train having the lower gear ratio being connected to the rear axle.

* * * * *